US011329491B2

(12) United States Patent
Tai et al.

(10) Patent No.: US 11,329,491 B2
(45) Date of Patent: May 10, 2022

(54) DISTRIBUTED BATTERY BALANCE MANAGEMENT METHOD AND BATTERY SYSTEM USING THIS METHOD

(71) Applicant: Richtek Technology Corporation, Zhubei (TW)

(72) Inventors: Wei-Ting Tai, Hsinchu (TW); Wei-Hsu Chang, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 102 days.

(21) Appl. No.: 16/890,000

(22) Filed: Jun. 2, 2020

(65) Prior Publication Data
US 2021/0075229 A1 Mar. 11, 2021

(30) Foreign Application Priority Data
Sep. 11, 2019 (TW) .................................. 108132722

(51) Int. Cl.
*H02J 7/00* (2006.01)
(52) U.S. Cl.
CPC ............ *H02J 7/0016* (2013.01); *H02J 7/007* (2013.01); *H02J 7/0018* (2013.01); *H02J 7/007182* (2020.01)
(58) Field of Classification Search
CPC ........ H02J 7/0016; H02J 7/0018; H02J 7/007; H02J 7/007182
USPC .................. 320/118, 122, 134, 141, 156, 161
See application file for complete search history.

(56) References Cited

U.S. PATENT DOCUMENTS

| 2010/0052615 | A1* | 3/2010 | Loncarevic | ........... H02J 7/0016 320/118 |
| 2014/0015488 | A1* | 1/2014 | Despesse | ............ H01M 10/425 320/122 |
| 2014/0306662 | A1* | 10/2014 | Kim | ........................ H02J 7/007 320/118 |
| 2018/0043789 | A1* | 2/2018 | Goetz | ..................... B60L 50/64 |
| 2019/0312318 | A1* | 10/2019 | Myers | ................. H01M 10/425 |

* cited by examiner

*Primary Examiner* — Edward Tso
*Assistant Examiner* — Aaron Piggush
(74) *Attorney, Agent, or Firm* — Tung & Associates

(57) ABSTRACT

A distributed battery balance management method includes: performing a battery system balancing procedure by a battery system balance management unit and performing battery module balancing procedure by module balance management circuit (MBMC) of corresponding battery module (BM). The battery system balancing procedure includes: obtaining lowest module voltages of corresponding BMs; obtaining a lowest system voltage and an average system voltage of the battery system; determining whether the lowest module voltage of the corresponding BM is greater than the average system voltage; when yes, setting a balance time duty ratio of the corresponding MBMC as a first duty ratio; when no, setting the balance time duty ratio of the corresponding MBMC as a second duty ratio; and setting module balance enable signal of corresponding MBMC to be enable, thus allowing the corresponding BM to perform voltage balance control on the batteries in the corresponding BM.

32 Claims, 13 Drawing Sheets

DISTRIBUTED BATTERY BALANCE MANAGEMENT METHOD AND BATTERY SYSTEM USING THIS METHOD

CROSS REFERENCE

The present invention claims priority to TW 108132722, filed on Sep. 11, 2019.

BACKGROUND OF THE INVENTION

Field of Invention

The present invention relates to a battery balance management method; particularly, it relates to a distributed battery balance management method. The present invention also relates to a battery system which adopts such distributed battery balance management method.

Description of Related Art

Please refer to FIG. 1, which shows a schematic diagram of a prior art battery system. The prior art battery system 100 comprises: a battery system management unit 11 and M battery modules (abbreviated hereinafter as "BM") 12-1, 12-2, ..., 12-M-1, 12-M. Each BM (BM 12-1) includes: a corresponding module management circuit (abbreviated hereinafter as "MMC") 121, a corresponding battery group 123 and N corresponding balancing circuits 122-1, ..., 122-N-1, 122-N. Each battery group 123 has N batteries B-1, ..., B-N-1, B-N connected in series, and each battery group 123 is coupled to the corresponding MMC.

Take the BM 12-1 as an example. The prior art in FIG. 1 has a drawback that: in the battery group 123 of the BM 12-1, there is a problem of voltage imbalance among the N batteries B-1, ..., B-N-1, B-N connected in series.

To solve the problem of voltage imbalance, it is required for the prior art battery system 100 to perform operations of voltage conversion, voltage sensing and voltage monitoring for every battery (B-1, ..., B-N-1, and B-N) of every BM (12-1, 12-2, ..., 12-M-1, and 12-M), to achieve voltage balance control on the entire battery system 100. In this case, the prior art in FIG. 1 has a major drawback. More specifically, all information obtained from the above-mentioned operations of voltage conversion, voltage sensing and voltage monitoring are respectively transmitted from the MMCs 121 of the BMs (12-1, 12-2, ..., 12-M-1, and 12-M) back to the battery system management unit 11 via a communication interface ID1, and thereafter the battery system management unit 11 transmits the required respective voltage balance control mechanism respectively to corresponding BMs (12-1, 12-2, ..., 12-M-1, 12-M) via the communication interface ID1. That is, in the prior art, the MMC 121 of each BM (12-1, 12-2, ..., 12-M-1, 12-M) cannot independently perform the required voltage balance control.

Given such situation, the prior art in FIG. 1 has a major drawback that: the management of all the information obtained from the operations of voltage conversion, voltage sensing and voltage monitoring and the voltage balance control on the entire battery system 100 can only be carried out through the battery system management unit 11. When there are a high number of BMs (i.e., M is large) and when there are a high number of batteries (i.e., N is large), because information-processing loading for the battery system management unit 11 is heavy, the processing procedure performed by the battery system management unit 11 will become very complicated and very time-consuming. Consequently and undesirably, when the prior art battery system 100 performs the voltage balance control on the entire battery system 100, the voltage imbalance problem cannot be immediately recovered and it requires a long delay.

In view of the above, to overcome the drawbacks in the prior art, the present invention proposes a distributed battery balance management method and a battery system which adopts such distributed battery balance management method. As compared to the prior art in FIG. 1, the present invention is advantageous in that: because the voltage balance control mechanism of the entire battery system is much more simple, the present invention is less time-consuming and has a faster response to the voltage imbalance problem.

SUMMARY OF THE INVENTION

From one perspective, the present invention provides a distributed battery balance management method, which is configured to operably control a battery system to achieve system voltage balance for the entire battery system, wherein the battery system comprises: a battery system balance management unit and a total of M battery modules (BM), wherein the BMs are coupled to the battery system balance management unit via a communication interface, wherein M is a positive integer greater than one, wherein each BM includes: a module balance management circuit (MBMC), which is coupled to the battery system balance management unit via the communication interface; a battery group having a total of N batteries connected in series, wherein each battery group is coupled to the corresponding MBMC, wherein N is a positive integer greater than one; and a total of N balancing circuits, wherein each balancing circuit is coupled to the corresponding battery and the balancing circuits are coupled to the MBMC of the corresponding BM, wherein the BMs as a whole include a total of M battery groups which are connected in series, wherein the M battery groups are configured to operably supply a battery system voltage; the distributed battery balance management method comprising: performing a battery system balancing procedure by the battery system balance management unit; and performing a battery module balancing procedure by the MBMC of the corresponding BM; wherein the battery system balancing procedure includes: (S13): obtaining voltages of all the batteries of the battery system by the MBMCs via the communication interface and obtaining a lowest module voltage of each corresponding BM, wherein the lowest module voltage is defined as a lowest voltage among all the voltages of N batteries in the corresponding BM; (S14): computing and obtaining a lowest system voltage and an average system voltage of the battery system according to the voltages of all the batteries of the battery system, wherein the lowest system voltage is defined as a lowest voltage among the voltages of all the batteries of the battery system, wherein the average system voltage is defined as an average of the voltages of all the batteries of the battery system; and a module setting step (S15): performing following steps on each BM: (S152): determining whether the lowest module voltage of the corresponding BM is greater than the average system voltage; when it is determined yes, proceeding to a step (S153); when it is determined no, proceeding to a step (S154); (S153): setting a balance time duty ratio of the corresponding MBMC as a first duty ratio; (S154): setting the balance time duty ratio of the corresponding MBMC as a second duty ratio, wherein the first duty ratio is greater than the second duty ratio; and (S155): setting a module balance enable signal of the corresponding MBMC to be enable, wherein when the module balance enable signal of the corresponding MBMC is enable, allowing the corresponding BM to perform voltage balance control on the total of N batteries in the corresponding BM; wherein in the battery module balancing procedure, each MBMC is configured to operably control each balancing circuit of the corresponding BM according to the corresponding balance time duty ratio, thereby performing the voltage balance control on the battery corresponding to the balancing circuit.

In one embodiment, the module setting step (S15) further includes: performing following steps on each BM: (S151): determining whether a difference between the lowest module voltage of the corresponding BM and the lowest system voltage is greater than a first difference threshold; when it is determined yes, proceeding to the step (S152); when it is determined no, proceeding to a step (S158); and (S158): setting the module balance enable signal of the corresponding MBMC of the corresponding BM to be disable; wherein when the module balance enable signal is disable, forbidding the corresponding BM to perform the voltage balance control on any of the batteries in the corresponding BM.

In one embodiment, the battery system balancing procedure further includes: (S12): determining whether the battery system is being discharged according to a system current of the battery system; when it is determined no, proceeding to the step (S13); when it is determined yes, proceeding to a step (S18); wherein the step (S18) includes: setting all the module balance enable signals of all the M BMs of the battery system to be disable.

In one embodiment, the battery system balancing procedure further includes: (S21): subsequent to the step (S15), after a first delay period has passed, returning back to the step (S13).

In one embodiment, the battery system balancing procedure further includes: (S21): subsequent to the step (S15), after a first delay period has passed, returning back to the step (S12).

In one embodiment, after the module setting step (S15) has been performed on all the M BMs, the distributed battery balance management method further includes: (S16): determining whether the battery system balancing procedure is required to be performed according to a first external command; when it is determined yes, returning back to the step (S12) after a second delay period has passed; when it is determined no, proceeding to a step (S20).

In one embodiment, the first duty ratio and the second duty ratio are obtained according to one of the following ways: (1) the second duty ratio is a predetermined value, whereas, the first duty ratio is the predetermined value plus a duty ratio difference; (2) the first duty ratio is a predetermined value, whereas, the second duty ratio is the predetermined value minus a duty ratio difference; or (3) the first duty ratio is a predetermined value plus a duty ratio difference, whereas, the second duty ratio is the predetermined value minus the duty ratio difference.

In one embodiment, the duty ratio difference is a constant.

In one embodiment, the duty ratio difference is correlated with a balance voltage difference or a balance battery capacity.

In one embodiment, the battery module balancing procedure includes: (S43): each MBMC collects voltages of the batteries of the battery group of the corresponding BM and each MBMC computes and obtains the lowest module voltage of the corresponding BM according to all the N batteries of the corresponding BM; and a balance enablement step (S45): performing following steps on each battery: (S452): determining whether a difference between the lowest module voltage of the corresponding BM and the voltage of the corresponding battery is greater than a second difference threshold; when it is determined yes, proceeding to a step (S453); when it is determined no, proceeding to a step (S454); (S453): each MBMC enables the balancing circuit corresponding to the battery to perform the voltage balance control on the battery according to the corresponding balance time duty ratio; and (S454): each MBMC disables the corresponding balancing circuit of the corresponding battery.

In one embodiment, the balance enablement step (S45) further includes: (S451): determining whether the voltage of the corresponding battery is greater than a lower-limit threshold; when it is determined yes, proceeding to the step (S452); when it is determined no, proceeding to the step (S454).

In one embodiment, the battery module balancing procedure further includes: (S42): determining whether the module balance enable signal of the corresponding MBMC is enable; when it is determined yes, proceeding to the step (S43); when it is determined no, proceeding to a step (S52); wherein the step (S52) includes: disabling all the N balancing circuits of the corresponding BM.

In one embodiment, the battery module balancing procedure further includes: (S55): subsequent to the step (S45), after a third delay period has passed, returning back to the step (S43).

In one embodiment, the battery module balancing procedure further includes: (S55): subsequent to the step (S45), after a third delay period has passed, returning back to the step (S42).

In one embodiment, after the balance enablement step (S45) has been performed on all the N batteries, the distributed battery balance management method further includes: (S50): determining whether the battery module balancing procedure is required to be performed according to a second external command; when it is determined yes, returning back to the step (S42) after a fourth delay period has passed; when it is determined no, proceeding to a step (S53).

In one embodiment, each balancing circuit includes a bypass switch and a bypass resistive device, wherein the bypass switch and the bypass resistive device are coupled to the corresponding battery; wherein the step (S453) includes: each BM is configured to operably control the corresponding bypass switch according to the corresponding balance time duty ratio, so that a bypass current flows through the corresponding bypass switch for a corresponding balance time, thereby performing the voltage balance control on the corresponding battery of the corresponding balancing circuit; wherein the balance time is positively proportional to the corresponding balance time duty ratio.

From another perspective, the present invention provides a battery system, comprising: a battery system balance management unit; and a total of M battery modules (BM), which are coupled to the battery system balance management unit via a communication interface, wherein M is a positive integer greater than one; wherein each BM includes: a module balance management circuit (MBMC), which is coupled to the battery system balance management unit via the communication interface; a battery group having a total of N batteries connected in series, wherein each battery group is coupled to the corresponding MBMC, wherein N is a positive integer greater than one; and a total of N balancing circuits, wherein each balancing circuit is coupled to the corresponding battery and the balancing circuits are coupled to the corresponding MBMC, wherein the BMs as a whole include a total of M battery groups which are connected in series, wherein the M battery groups are configured to operably supply a battery system voltage; wherein the battery system balance management unit is configured to operably perform a battery system balancing procedure; wherein each MBMC of the corresponding BM is configured to operably perform a corresponding battery module balancing procedure; wherein the battery system balancing procedure performed by the battery system balance management unit includes: (S13): obtaining voltages of all the batteries of the battery system by the MBMCs via the communication interface and obtaining a lowest module voltage of each corresponding BM, wherein the lowest module voltage is defined as a lowest voltage among all the voltages of N batteries in the corresponding BM; (S14): computing and obtaining a lowest system voltage and an average system voltage of the battery system according to the voltages of all the batteries of the battery system, wherein the lowest system voltage is defined as a lowest voltage among the voltages of all the batteries of the battery system, wherein the average system voltage is defined as an average of the voltages of all the batteries of the battery system; and a module setting step (S15): performing following steps on each BM: (S152): determining whether the lowest module voltage of the corresponding BM is greater than the average system voltage; when it is determined yes, proceeding to a step (S153); when it is determined no, proceeding to a step (S154); (S153): setting a balance time duty ratio of the corresponding MBMC as a first duty ratio; (S154): setting the balance time duty ratio of the corresponding MBMC as a second duty ratio, wherein the first duty ratio is greater than the second duty ratio; and (S155): setting a module balance enable signal of the corresponding MBMC to be enable, wherein when the module balance enable signal of the corresponding MBMC is enable, allowing the corresponding BM to perform voltage balance control on the total of N batteries in the corresponding BM; wherein each MBMC is configured to operably control each balancing circuit of the corresponding BM according to the corresponding balance time duty ratio, thereby performing the voltage balance control on the battery corresponding to the balancing circuit.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
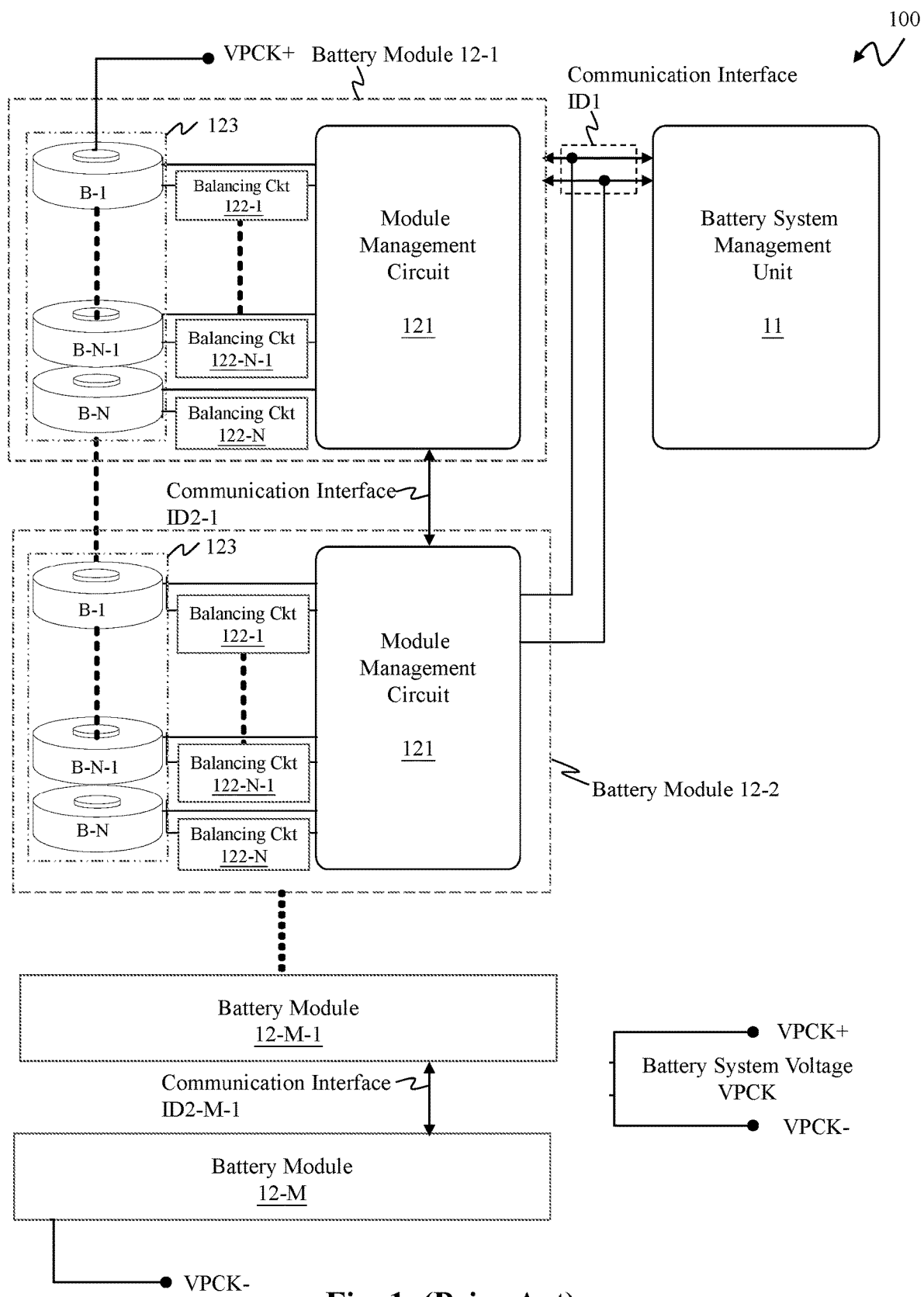
FIG. 1 shows a schematic diagram of a prior art battery system.
Figure 2:
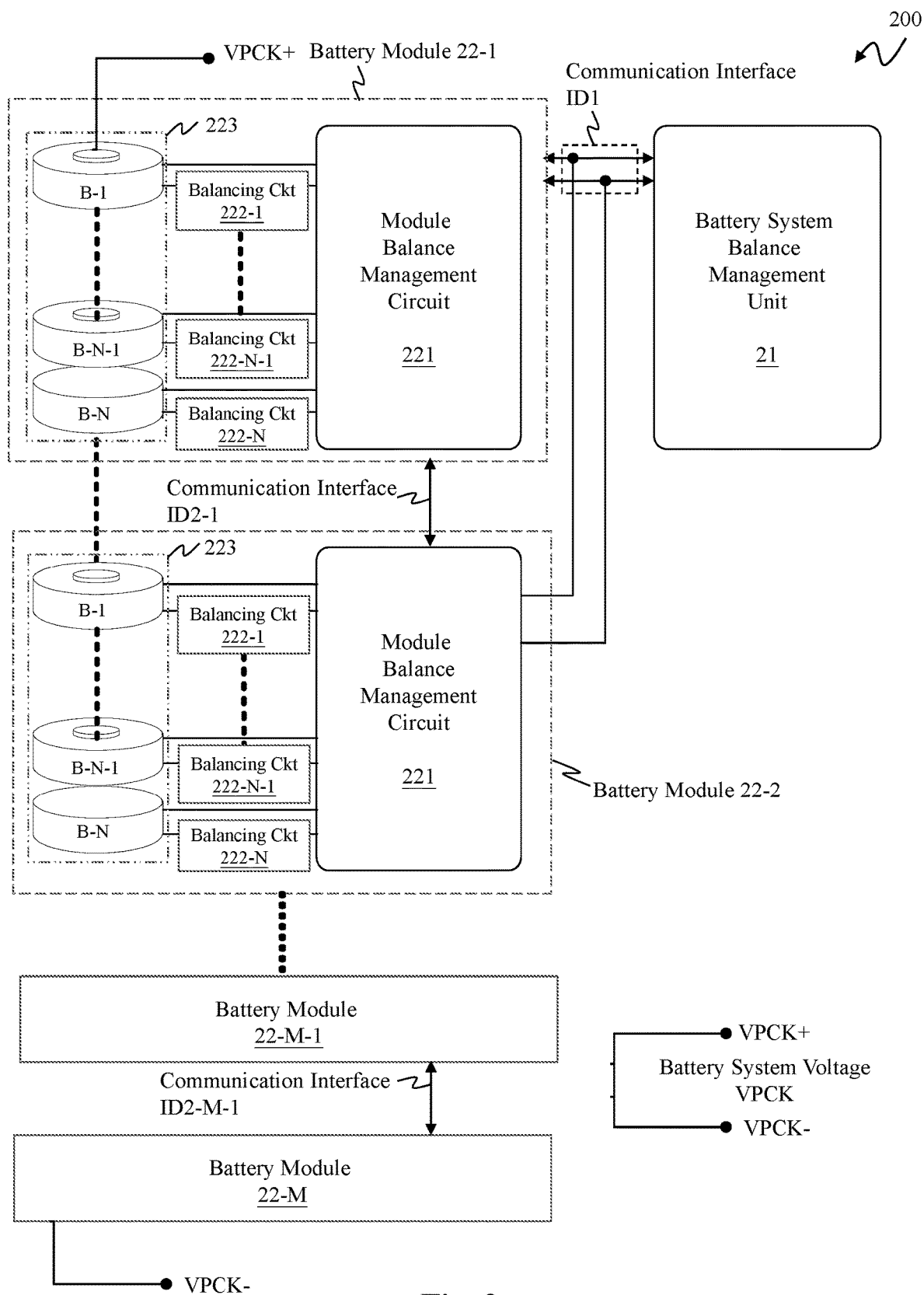
FIG. 2 shows a schematic diagram of a battery system according to an embodiment of the present invention.
Figure 5:
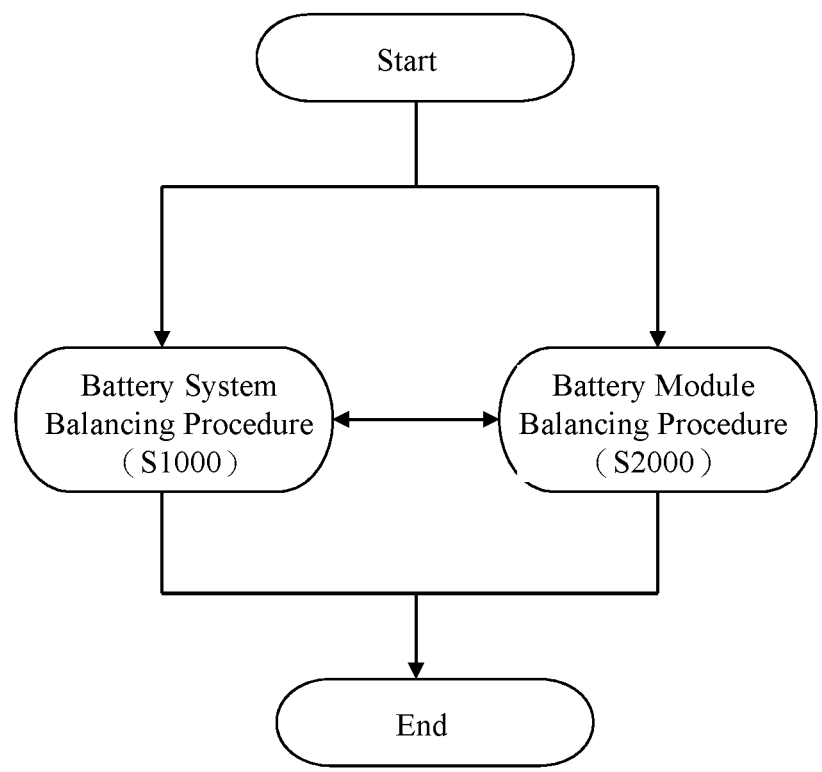
FIG. 5 shows a distributed battery balance management method according to an embodiment of the present invention.

Please refer to FIG. 2 along with FIG. 5. FIG. 2 shows a schematic diagram of a battery system (i.e., battery system 200) according to an embodiment of the present invention. FIG. 5 shows a distributed battery balance management method according to an embodiment of the present invention.

As shown in FIG. 2, in one embodiment, the battery system 200 of the present invention comprises: a battery system balance management unit 21 and M battery modules 22-1, 22-2, . . . , 22-M-1, 22-M (abbreviated hereinafter as "BM"). In one embodiment, M is a positive integer greater than one. Each BM (e.g., 22-1, 22-2, . . . , 22-M-1, 22-M) is coupled to the battery system balance management unit 21 via a communication interface ID1

Each BM (e.g., 22-1, 22-2, . . . , 22-M-1, 22-M) includes: a corresponding module balance management circuit 221 (abbreviated hereinafter as "MBMC"), a corresponding battery group 223 and N corresponding balancing circuits 222-1, . . . , 222-N-1, 222-N. In one embodiment, N is a positive integer greater than one. Each MBMC 221 of the corresponding BM (e.g., 22-1, 22-2, . . . , 22-M-1, 22-M) is coupled to the battery system balance management unit 21 via the communication interface ID1. Each battery group 223 of the corresponding BM (e.g., 22-1, 22-2, . . . , 22-M-1, 22-M) has Nbatteries B-1, . . . , B-N-1, B-N connected in series. Each battery group 223 is coupled to the corresponding MBMC 221. Each balancing circuit (e.g., 222-1, . . . , 222-N-1, 222-N) of the corresponding BM (e.g., 22-1, 22-2, . . . , 22-M-1, 22-M) is coupled to the corresponding battery (e.g., B-1, . . . , B-N-1, B-N). And, each balancing circuit (e.g., 222-1, . . . , 222-N-1, 222-N) of the corresponding BM (e.g., 22-1, 22-2, . . . , 22-M-1, 22-M) is coupled to the corresponding MBMC 221.

As shown in FIG. 2, in one embodiment, the BMs (22-1, 22-2, . . . , 22-M-1, 22-M) are connected in series with one another, that is, neighboring BMs are connected to each other via corresponding communication interfaces ID2-1, . . . , ID2-M-1, respectively. For example, The BM 22-1 and the BM 22-2 which are neighboring to each other are connected to each other via the communication interface ID2-1. For another example, the BM 22-M-1 and the BM 22-M which are neighboring to each other are connected to each other via the communication interface ID2-M-1. As a result, from one perspective, the M battery groups 223 of the M BMs (22-1, 22-2, ..., 22-M−1, 22-M) are connected in series with one another, so that the M battery groups of the battery system 200 are configured to operably supply a battery system voltage VPCK. As shown in FIG. 2, the anode of the battery B-1 of the BM 22-1 is adopted as a battery positive output terminal VPCK+ of the battery system 200, while, the cathode (not shown in FIG. 2) of the battery B-N of the BM 22-M is adopted as a battery negative output terminal VPCK− of the battery system 200. Thus, there is a battery system voltage VPCK across the battery positive output terminal VPCK+ and the battery negative output terminal VPCK−.

Take the BM 22-1 as an example. In the battery group 223 of the BM 22-1, the voltages of the N batteries B-1, ..., B-N−1, B-N connected in series may be different from one another. For example, the voltage of the battery B-1 is 4.2V; the voltage of the battery B-N−1 is 3.9V; the voltage of the battery is 3.6V; while, the voltages of the rest batteries range between 4.2V and 3.6V. In brief, different batteries may have different voltages, which is the voltage imbalance problem. Such voltage imbalance problem may also occur among the batteries in the battery group 223 of the other BMs (22-2, ..., 22-M−1, 22-M).

To solve the problem of voltage imbalance, the present invention proposes the distributed battery balance management method shown in FIG. 5, to achieve system voltage balance for the entire battery system 200. As shown in FIG. 5, the distributed battery balance management method of the present invention comprises: performing a battery system balancing procedure S1000 via the battery system balance management unit 21, and performing a battery module balancing procedure S2000 via each MBMC 221 of the BMs (22-1, 22-2, ..., 22-M−1, 22-M). The features and the details as to how the battery system balance management unit 21 performs the battery system balancing procedure S1000 and how each MBMC 221 performs the battery module balancing procedure S2000 will be described later.

Note that to achieve "system voltage balance for the entire battery system", according to the present invention, is to adopt the above-mentioned distributed battery balance management method to perform a voltage balance control on every battery in each BM, so that all batteries in the battery system 200 have a balanced voltage.

Figure 3:
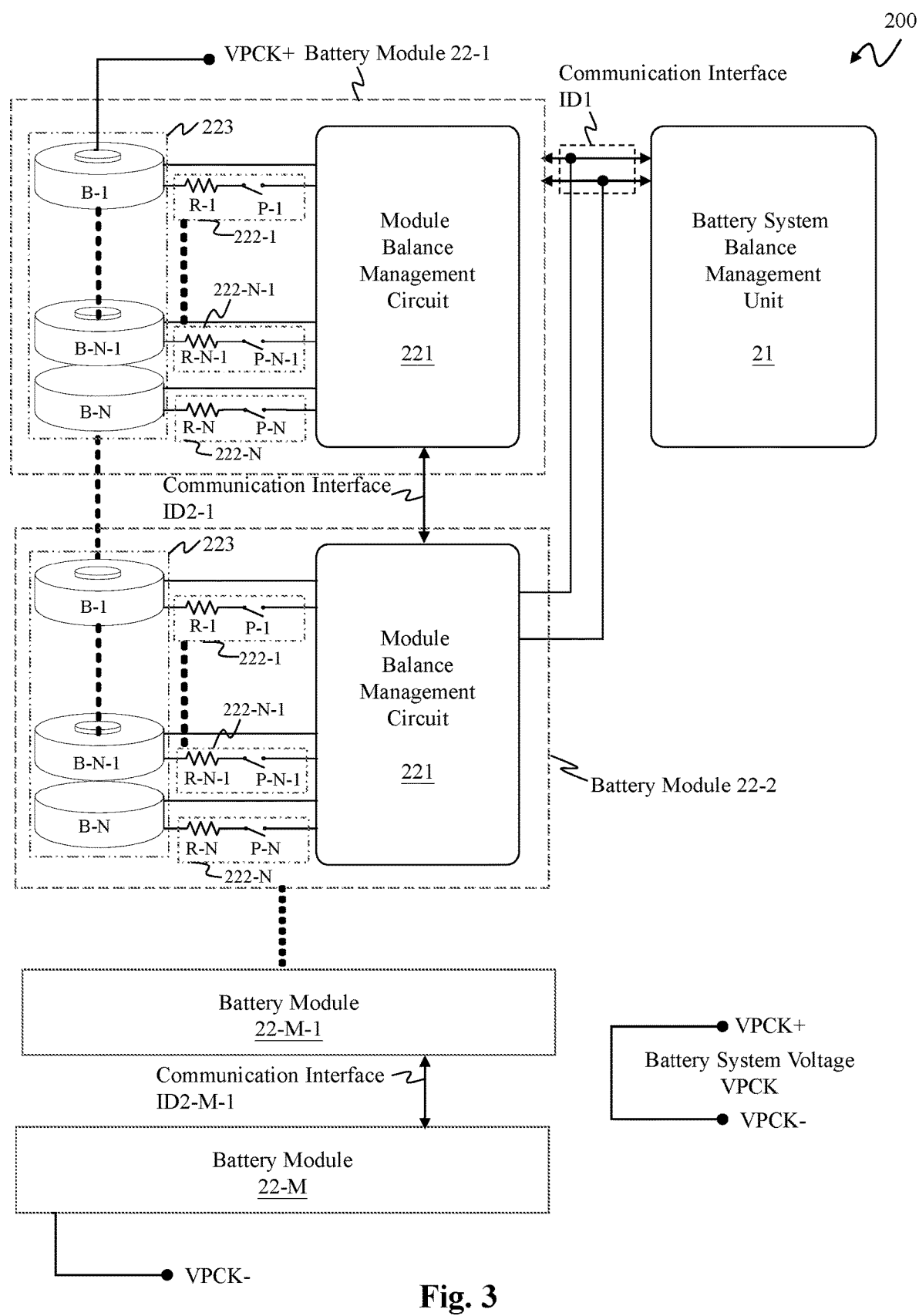
FIG. 3 shows an embodiment of the balancing circuits in the battery system.
Figure 4:
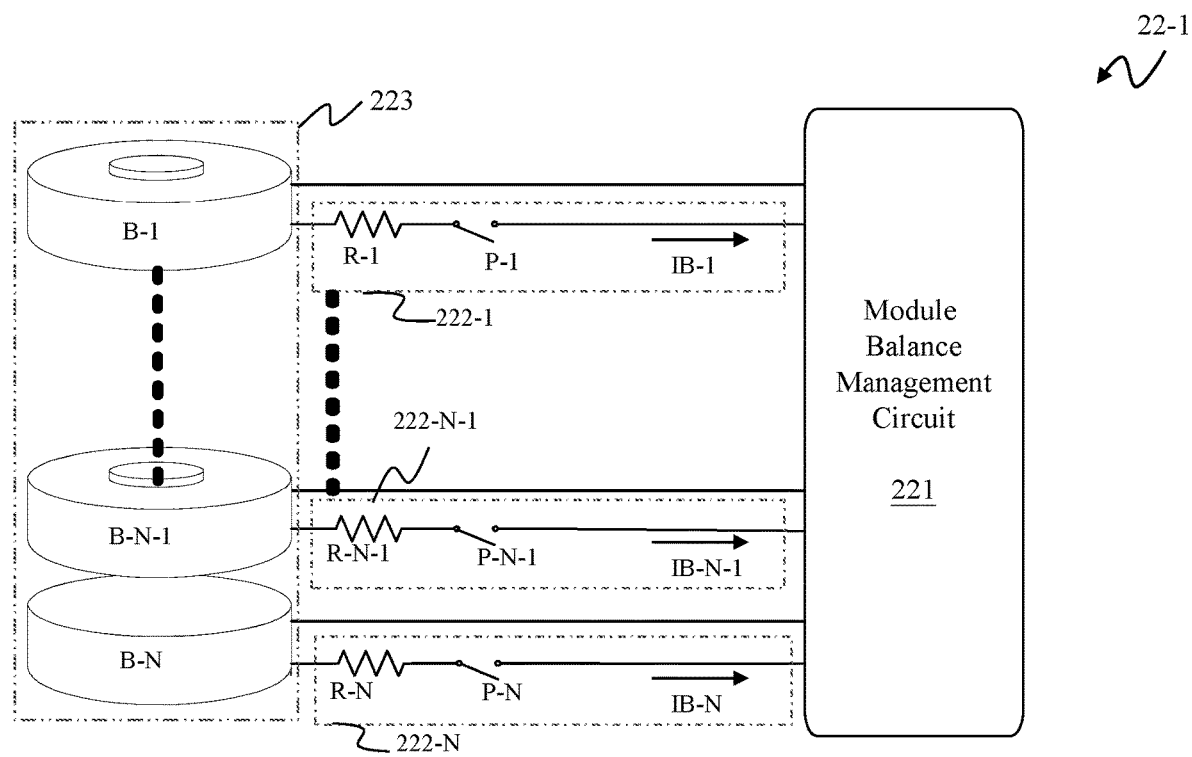
FIG. 4 shows a specific embodiment of the balancing circuits of the battery module 22-1.

Please refer to FIG. 2 along with FIG. 3 and FIG. 4. FIG. 3 shows an embodiment of the balancing circuits in the battery system. FIG. 4 shows a specific embodiment of the balancing circuits of the battery module 22-1.

For simplicity, the features and the advantages of the present invention will be explained with reference to the BM 22-1 as an exemplary demonstration. Certainly, it should be understood that the rest BMs (22-2, ..., 22-M−1, 22-M) have the same features and advantages as the BM 22-1 does.

As shown in FIG. 3 and FIG. 4, in one embodiment, in the BM 22-1, each balancing circuit (222-1, ..., 222-N−1, 222-N) includes a corresponding bypass switch (P-1, ..., P-N−1, P-N) and a corresponding bypass resistive device (R-1, ..., R-N−1, R-N). In one embodiment, the bypass switch (P-1, ..., P-N−1, P-N) and the bypass resistive device (R-1, ..., R-N−1, R-N) are coupled to the corresponding battery (B-1, ..., B-N−1, B-N).

According to the present invention, by the distributed battery balance management method, each MBMC 221 of each BM (e.g. 22-1) can control the corresponding bypass switch (P-1, ..., P-N−1, P-N) according to a corresponding balance time duty ratio, so that a corresponding bypass current (IB-1, ..., IB-N−1, IB-N) flows through the bypass switch (P-1, ..., P-N−1, P-N) for a balance time which corresponds to the BM (e.g. 22-1), thereby performing voltage balance control on the batteries (B-1, ..., B-N−1, B-N) corresponding to the balancing circuits (222-1, ..., 222-N−1, 222-N). In one embodiment, the net balance time corresponding to each balancing circuit (222-1, ..., 222-N−1, 222-N) is positively proportional to the balance time duty ratio of the BM 22-1 (because the net balance time is the balance time duty ratio multiplied by the number of enabled cycle periods). The features and the details of the balance time duty ratio will be described later.

Figure 6:
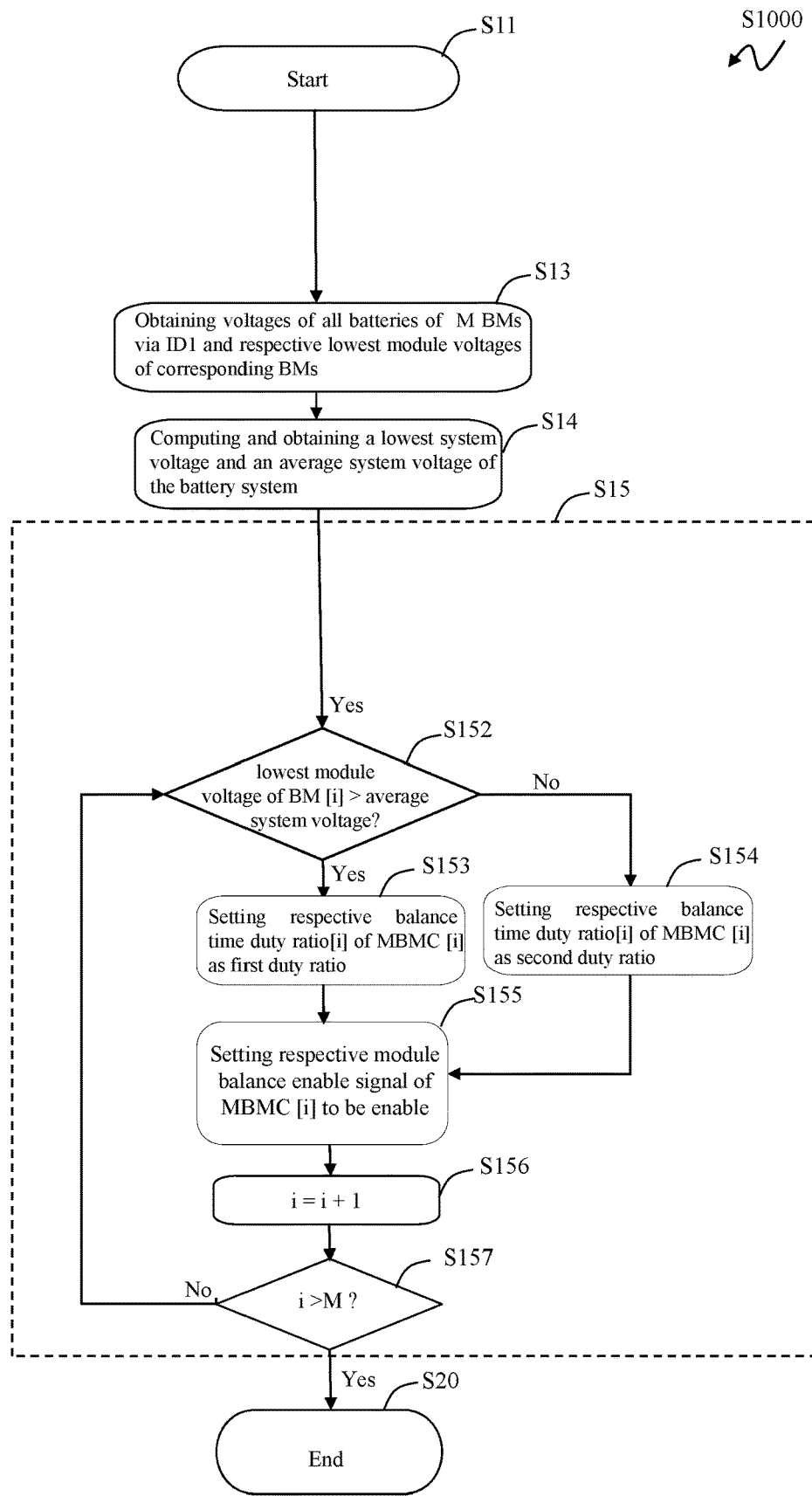
FIG. 6 shows an embodiment of a battery system balancing procedure S1000 performed by the battery system balance management unit.

Please refer to FIG. 3 and FIG. 4 in conjugation with FIG. 6. FIG. 6 shows an embodiment of a battery system balancing procedure S1000 performed by the battery system balance management unit.

First, the distributed battery balance management method of the present invention performs the battery system balancing procedure S1000 by the battery system balance management unit 21.

As shown in FIG. 6, in one embodiment, the battery system balancing procedure S1000 performed by the battery system balance management unit 21 includes: start (as shown by the step S11 in FIG. 6); next, the battery system balance management unit 21 obtains the voltages of all the batteries of the M BMs (22-1, 22-2, ..., 22-M−1, 22-M) in the battery system 200 through the MBMC 221 of each BM (22-1, 22-2, ..., 22-M−1, 22-M) via the communication interface ID1 (as shown by the step S13 in FIG. 6); in addition, the battery system balance management unit 21 obtains a lowest module voltage of each BM (22-1, 22-2, ..., 22-M−1, 22-M) via the communication interface ID1 (also as shown by the step S13 in FIG. 6).

In one embodiment, taking the BM 22-1 as an example, the "lowest module voltage" of the BM 22-1 is a lowest voltage among all the voltages of N batteries (B-1, ..., B-N−1, B-N) in the BM 22-1. Similarly, the "lowest module voltage" of the BM 22-2 is a lowest voltage among all the voltages of N batteries (B-1, ..., B-N−1, B-N) in the BM 22-2. Similarly, the "lowest module voltage" of the BM 22-M is a lowest voltage among all the voltages of N batteries (B-1, ..., B-N−1, B-N) in the BM 22-M. In other words, according to the present invention, in the step S13 in FIG. 6, the M BMs (22-1, 22-2, ..., 22-M−1, 22-M) will have a total of M "lowest module voltages".

Next, the battery system balance management unit 21 computes and obtains a lowest system voltage and an average system voltage of the battery system 200 according to the voltages of all the batteries of the M BMs (22-1, 22-2, ..., 22-M−1, 22-M) in the battery system 200 (as shown by the step S14 in FIG. 6).

The "lowest system voltage" is a lowest voltage among the voltages of all the batteries (in this embodiment, there are a total of M*N batteries) of the M BMs (22-1, 22-2, ..., 22-M−1, 22-M) in the battery system 200. And, the "average system voltage" is an average of the voltages of all the batteries (in this embodiment, M*N batteries) of the M BMs (22-1, 22-2, ..., 22-M−1, 22-M) in the battery system 200.

Next, the battery system balancing procedure S1000 performed by the battery system balance management unit 21 performs a "module setting step" (as shown by the step S15 in FIG. 6). In the module setting step S15, the battery system balance management unit 21 can perform the following steps on each BM of the M BMs (22-1, 22-2, ..., 22-M−1, 22-M).

To be more specific, in the "module setting step" (as shown by the step S15 in FIG. 6), first, the battery system balance management unit 21 determines whether the lowest module voltage of each BM (22-1, 22-2, . . . , 22-M–1, 22-M) is greater than the average system voltage (as shown by the step S152 in FIG. 6).

Next, the battery system balance management unit 21 determines whether the BM proceeds to the step S153 according to the corresponding determination result for the BM in the step S152. In other words, when the determination result for a certain BM in the step S152 is yes, the step S153 is performed on this certain BM. In one embodiment, the step S153 is that: for a BM whose determination result in the step S152 is yes, the battery system balance management unit 21 sets a balance time duty ratio of the MBMC 221 corresponding to this BM as a first duty ratio.

On the other hand, when the determination result for a certain BM in the step S152 is no, the step S154 is performed on this certain BM. In one embodiment, the step S154 is that: for a BM whose determination result in the step S152 is no, the battery system balance management unit 21 sets the balance time duty ratio of the MBMC 221 corresponding to this BM as a second duty ratio.

In one embodiment, taking the BM 22-1 as an example, the MBMC 221 of the BM 22-1 has one single corresponding "balance time duty ratio". Similarly, the MBMC 221 of the BM 22-2 has another single corresponding "balance time duty ratio". Similarly, the MBMC 221 of the BM 22-M has another single corresponding "balance time duty ratio". In other words, according to the present invention (as shown by the step S153 and/or the step S154 in FIG. 6), the M BMs (22-1, 22-2, . . . , 22-M–1, 22-M) will have a total of M "balance time duty ratios" (which can be individually set as either the first duty ratio or the second duty ratio according to the step S152).

Note that, because there are different balance time duty ratios, and the net balance time is the balance time duty ratio multiplied by the number of enabled cycle periods, for different BMs under different voltage distribution conditions, the present invention can cause the net balance time of the BMs (22-1, 22-2, . . . , 22-M–1, 22-M) to be close to one another.

In one embodiment, the first duty ratio is greater than the second duty ratio. More specifically, when it is determined yes in the step S152 (this means that the lowest module voltage of the corresponding BM is greater than the average system voltage), the present invention applies a greater balance time duty ratio (i.e., the first duty ratio) to the batteries of such BM whose the determination result in the step S152 is yes, for voltage balance control. Thus, the present invention can individually and adaptively adjust the net balance time of each BM.

To be more specific, in one embodiment, the battery system balancing procedure S1000 performed by the battery system balance management unit 21 can set the second duty ratio as a predetermined value and set the first duty ratio as the predetermined value plus a duty ratio difference. In another embodiment, the battery system balancing procedure S1000 performed by the battery system balance management unit 21 can set the first duty ratio as a predetermined value and set the second duty ratio as the predetermined value minus a duty ratio difference. In still another embodiment, the battery system balancing procedure S1000 performed by the battery system balance management unit 21 can set the first duty ratio as a predetermined value plus a duty ratio difference and set the second duty ratio as the predetermined value minus the duty ratio difference.

In one embodiment, the above-mentioned duty ratio difference can be a constant (for example but not limited to, a value which is 50 percent of the above-mentioned predetermined value). In another embodiment, the above-mentioned duty ratio difference can be correlated with a balance voltage difference or a balance battery capacity.

In one embodiment, in the present invention, the above-mentioned balance voltage difference can be computed via the following equation:

$$\text{balance voltage difference} = \text{starting balance voltage difference} - \text{ending balance voltage difference}$$

In one embodiment, the starting balance voltage difference can be a difference between the lowest voltage of the batteries in a BM and a target voltage, and the ending balance voltage difference can be a predetermined target difference.

In one embodiment, in the present invention, the above-mentioned balance battery capacity can be computed via the following equation:

$$\text{balance battery capacity} = \text{fully-charged battery capacity} \times \text{imbalance state of charge (SOC) difference}$$

In one embodiment, the fully-charged battery capacity is the capacity when a battery is fully charged, and the imbalance SOC difference can be the balance voltage difference converted to a ratio.

In the "module setting step" (as shown by the step S15 in FIG. 6), subsequent to the step S153 and/or the step S154, the battery system balancing procedure S1000 performed by the battery system balance management unit 21 can set a module balance enable signal of the MBMC 221 of the corresponding BM (22-1, 22-2, . . . , 22-M–1, 22-M) to be enable (as shown by the step S155 in FIG. 6).

In one embodiment, taking the BM 22-1 as an example, the MBMC 221 of the BM 22-1 uses one single corresponding "module balance enable signal". Similarly, the MBMC 221 of the BM 22-2 uses another single corresponding "module balance enable signal". Similarly, the MBMC 221 of the BM 22-M uses another single corresponding "module balance enable signal".

In other words, according to the present invention (as shown by the step S155 in FIG. 6), the M BMs (22-1, 22-2, . . . , 22-M–1, 22-M) will have a total of M "module balance enable signals".

When the module balance enable signal of the MBMC 221 is enable, the battery module balancing procedure S2000 performed by the MBMC 221 can allow the corresponding BM (22-1, 22-2, . . . , 22-M–1, 22-M) to perform voltage balance control on the total of N batteries in the corresponding BM. As to how the present invention determines whether the battery module balancing procedure S2000 performed by each MBMC 221 should perform voltage balance control on a certain battery, it will be described later.

Next, the distributed battery balance management method of the present invention can perform battery module balancing procedure S2000 by each MBMC 221 on the corresponding BM (22-1, 22-2, . . . , 22-M–1, 22-M). In the battery module balancing procedure S2000 performed by the MBMC 221 of the corresponding BM (22-1, 22-2, . . . , 22-M–1, 22-M), the MBMC 221 is configured to individually control (enable or disable) each balancing circuit (222-1, . . . , 222-N–1, 222-N) of the corresponding BM (22-1, 22-2, . . . , 22-M–1, 22-M) to operate according to the corresponding balance time duty ratio, so as to perform the voltage balance control on the batteries (B-1, . . . , B-N–1, B-N). The details thereof will be explained later The present invention has features and advantages in that: (1) through the battery system balancing procedure S1000 performed by the battery system balance management unit 21, the present invention can individually set one or more of the M module balance enable signals of the corresponding M MBMCs 221 of the corresponding M BMs (22-1, 22-2, . . . , 22-M–1, 22-M) to be enable, whereby the corresponding BM (22-1, 22-2, . . . , 22-M–1, 22-M) can perform voltage balance control on the N batteries in the corresponding BM. (2) In addition, through the battery system balancing procedure S1000 performed by the battery system balance management unit 21, the present invention can obtain the M "balance time duty ratios" for the corresponding M MBMCs 221 of the corresponding M BMs (22-1, 22-2, . . . , 22-M–1, 22-M). The M "balance time duty ratios" obtained from the battery system balancing procedure S1000 are provided for use by the MBMC 221 of the corresponding BM (22-1, 22-2, . . . , 22-M–1, 22-M) to perform the corresponding battery module balancing procedure S2000. That is, in the battery module balancing procedure S2000, the M MBMCs 221 can individually control (enable or disable) each balancing circuit (222-1, . . . , 222-N–1, 222-N) of the corresponding BMs (22-1, 22-2, . . . , 22-M–1, 22-M) to operate according to the M "balance time duty ratios" obtained from the battery system balancing procedure S1000, to perform voltage balance control on each battery (B-1, . . . , B-N–1, B-N).

Consequently, each MBMC 221 can independently perform the corresponding battery module balancing procedure S2000, thereby independently achieving voltage balance control on the corresponding batteries (B-1, . . . , B-N–1, B-N) of the corresponding BM (22-1, 22-2, . . . , 22-M–1, 22-M). In brief, each BM can independently perform the corresponding voltage balance control, so that the entire battery system 200 can achieve system voltage balance wherein different BMs achieve module voltage balance at approximately the same time. As a result, the loading for the battery system balance management unit 21 is light whereby the response time is fast, so that the present invention can promptly respond to and solve the voltage imbalance problem in each BM. The features and the details as to how each MBMC 221 can independently perform the corresponding battery module balancing procedure S2000 will be described later.

The voltage balance control by independently performing the corresponding battery module balancing procedure S2000 on each battery (B-1, . . . , B-N–1, B-N) of each BM achieves the effect that the voltages of all batteries in the battery system 200 are balanced.

In one embodiment, as shown in FIG. 6, subsequent to the step S155, the battery system balancing procedure S1000 can proceed to the step S156 and the step S157, that is, by a process loop, the battery system balancing procedure S1000 causes the M BMs of the battery system 200 to go through the above-mentioned same steps. Note that, the illustrated steps S156 and S157 are examples only, but not for limiting the scope of the present invention; in other embodiments, the process loop can be arranged differently (for example by a descending order instead of an ascending order). Additionally, the reference numeral "[i]" as shown in the BM [i], the MBMC [i] and the balance time duty ratio [i] in the step S15 of FIG. 6 is a number of count. In this embodiment, the count "i" will count from 1 to M+1, and at M+1 the battery system balancing procedure S1000 will exit the loop; however, the loop can be designed in other ways, still within the spirit of the present invention. Note that, the BM [i] corresponds to the BM 22-$i$ shown in FIG. 2 and the MBMC [i] corresponds to the MBMC 221 of the BM 22-$i$ shown in FIG. 2. In this embodiment, i=1-M.

Figure 7:
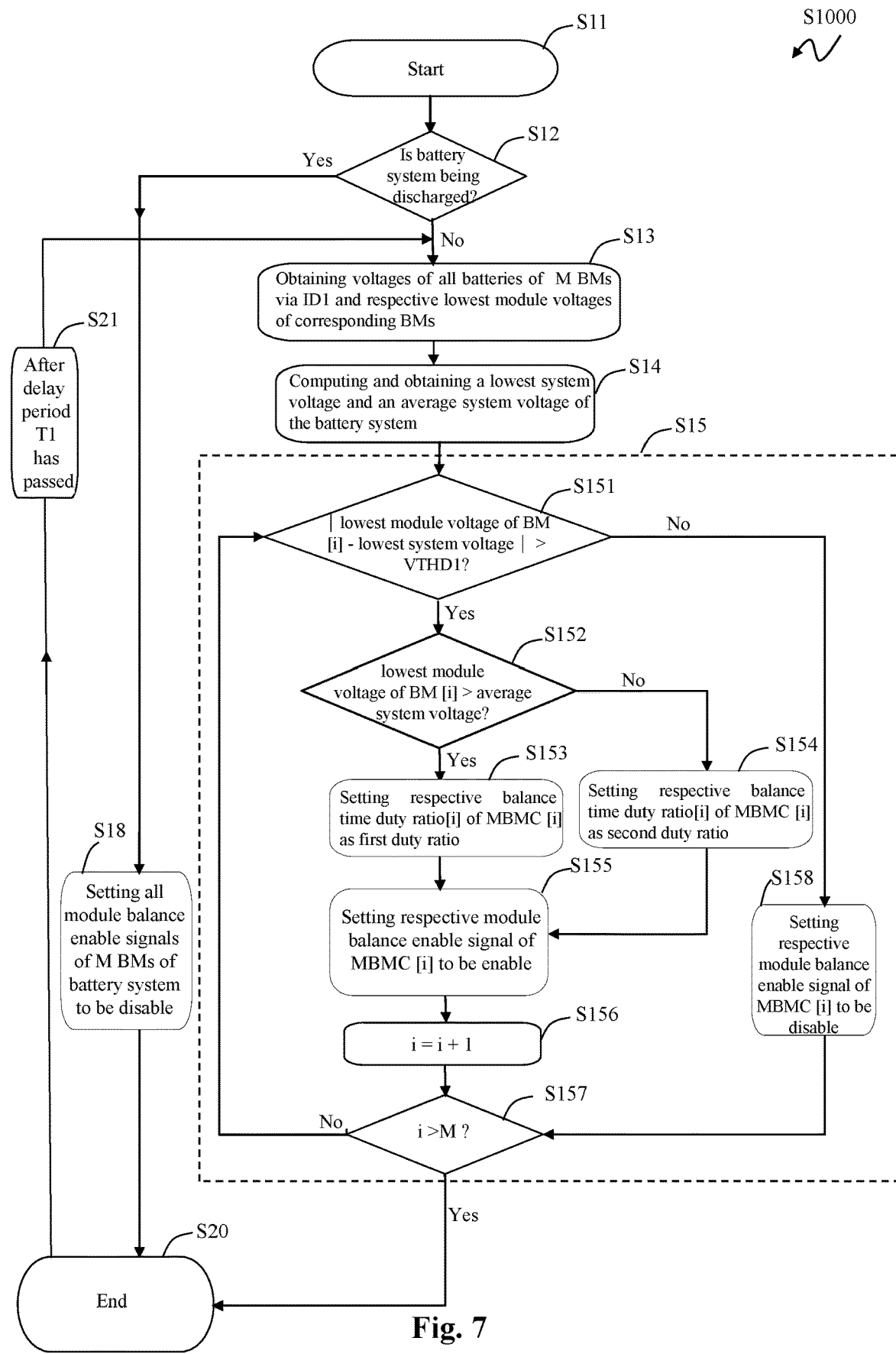
FIG. 7 shows another embodiment of a battery system balancing procedure S1000 performed by the battery system balance management unit.

Please refer to FIG. 7 along with FIG. 3 and FIG. 4. FIG. 7 shows another embodiment of a battery system balancing procedure S1000 performed by the battery system balance management unit.

As shown in FIG. 7, in one embodiment, the module setting step S15 (as shown by the step S15 in FIG. 7) in the battery system balancing procedure S1000 performed by the battery system balance management unit 21 can further determine whether a difference between the lowest module voltage of the corresponding BM (22-1, 22-2, . . . , 22-M–1, 22-M) and the lowest system voltage is greater than a difference threshold VTHD1 (as shown by the step S151 in FIG. 7). When it is determined yes in the step S151, the battery system balancing procedure S1000 performed by the battery system balance management unit 21 proceeds to the above-mentioned step of S152. When it is determined no in the step S151, the battery system balancing procedure S1000 performed by the battery system balance management unit 21 proceeds to the step S158.

In one embodiment, the step S158 includes: for a BM whose determination result in the step S151 is no, the battery system balance management unit 21 sets the module balance enable signal of the corresponding MBMC 221 of the corresponding BM to be disable. Note that, in one embodiment, when the module balance enable signal of the corresponding BM (where the determination result in the step S151 is no) is disable, the battery system balancing procedure S1000 performed by the battery system balance management unit 21 will forbid the corresponding BM to perform voltage balance control on any of the batteries in the corresponding BM.

Please still refer to FIG. 7 along with FIG. 3 and FIG. 4. As shown in FIG. 7, in one embodiment, the battery system balancing procedure S1000 performed by the battery system balance management unit 21 can further include the step S12. In one embodiment, the step S12 is that the battery system balance management unit 21 can further determine whether the battery system 200 is in a discharging condition (i.e. being discharged) according to a system current of the battery system 200.

In this embodiment, only when it is determined no in the step S12, the battery system balancing procedure S1000 then proceeds to the above-mentioned step S13.

On the other hand, when it is determined yes in the step S12, the battery system balancing procedure S1000 performed by the battery system balance management unit 21 proceeds to the step S18. In one embodiment, the step S18 is that the battery system balance management unit 21 sets all the module balance enable signals of all the M BMs of the battery system 200 to be disable. That is, all the M module balance enable signals of the battery system 200 are set to be disable. Next, in one embodiment, the battery system balancing procedure S1000 directly proceeds to the step S20 (as shown by the step S20 in FIG. 7), i.e., the battery system balancing procedure S1000 is ended.

Please still refer to FIG. 7 along with FIG. 3 and FIG. 4. As shown in FIG. 7, in one embodiment, the battery system balancing procedure S1000 performed by the battery system balance management unit 21 can further include the step S21. In one embodiment, the step S21 includes: subsequent to the step S15, the battery system balancing procedure S1000 performed by the battery system balance management unit 21 proceeds to the step S20 (as shown by the step S20 in FIG. 7), indicating that the battery system balancing procedure S1000 is ended; however, after a delay period T1 has passed (as shown by the step S21 in FIG. 7), the battery system balancing procedure S1000 performed by the battery system balance management unit 21 can return to the above-mentioned step S13 again. That is, in this embodiment, the step S20 can be regarded as one of the options. In other words, from one perspective, subsequent to the step S15, the battery system balancing procedure S1000 performed by the battery system balance management unit 21 can either choose to end (as shown by the step S20 in FIG. 7) or choose to return to a previous step by going through the step S21. It is noted here that all occurrences of the "end" in this specification can be regarded as just one of the options and the procedure can choose to return to a previous step.

Figure 8:
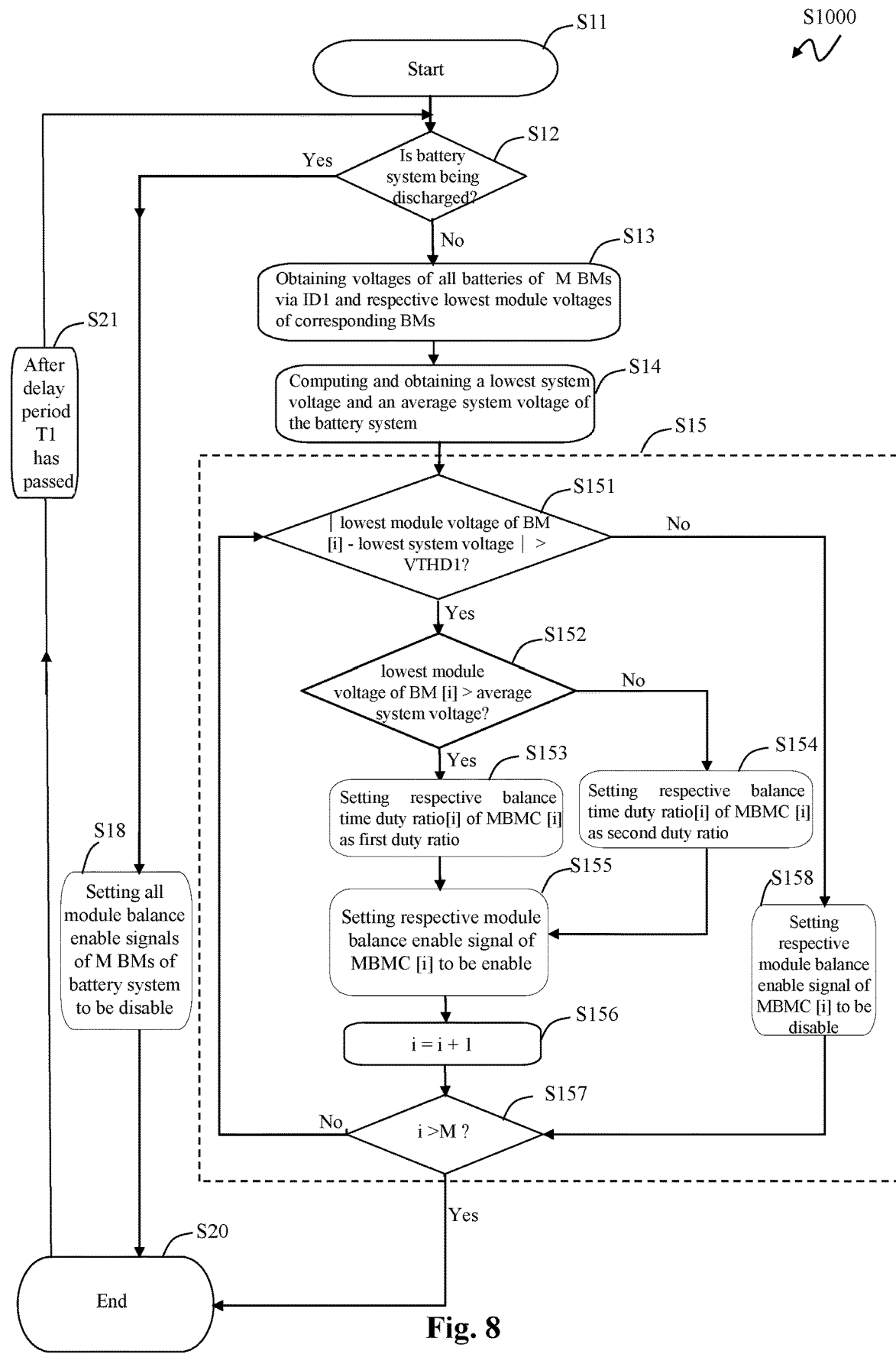
FIG. 8 shows yet another embodiment of a battery system balancing procedure S1000 performed by the battery system balance management unit.

Please refer to FIG. 8 along with FIG. 3 and FIG. 4. FIG. 8 shows yet another embodiment of a battery system balancing procedure S1000 performed by the battery system balance management unit. As shown in FIG. 8, in one embodiment, the battery system balancing procedure S1000 performed by the battery system balance management unit 21 can further include the step S21. In one embodiment, the step S21 includes: subsequent to the step S15, the battery system balancing procedure S1000 performed by the battery system balance management unit 21 directly proceeds to the step S20 (as shown by the step S20 in FIG. 8), indicating that the battery system balancing procedure S1000 is ended; however, after a delay period T1 has passed (as shown by the step S21 in FIG. 8), the battery system balancing procedure S1000 performed by the battery system balance management unit 21 can return to the above-mentioned step S12 again.

Figure 9:
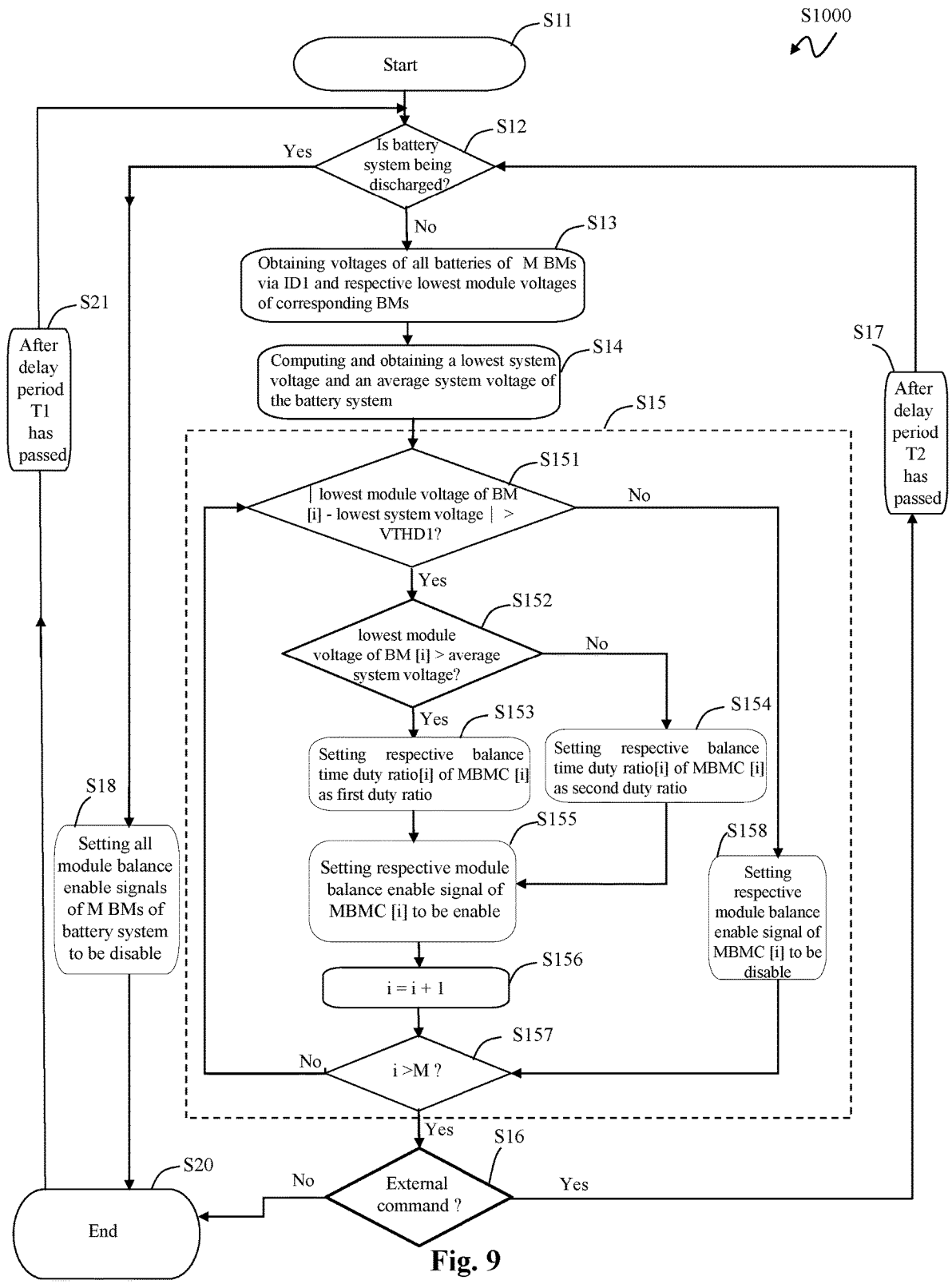
FIG. 9 shows still another embodiment of a battery system balancing procedure S1000 performed by the battery system balance management unit.

Please refer to FIG. 9 along with FIG. 3 and FIG. 4. FIG. 9 shows still another embodiment of a battery system balancing procedure S1000 performed by the battery system balance management unit.

As shown in FIG. 9, in one embodiment, after all the M BMs have performed the above-mentioned module setting step S15 (i.e., after the determination result in the step S157 shown in FIG. 9 has been determined as yes), the battery system balancing procedure S1000 performed by the battery system balance management unit 21 can further include the step S16. In one embodiment, the step S16 includes: subsequent to the step S15, the battery system balance management unit 21 determines whether the above-mentioned battery system balancing procedure S1000 is required to be performed according to an external command.

When it is determined yes in the step S16, the battery system balancing procedure S1000 can return to the above-mentioned step S12 after a delay period T2 has passed (as shown by the step S17 in FIG. 9).

When it is determined no in the step S16, the battery system balancing procedure S1000 can directly proceed to the above-mentioned step S20, indicating that the battery system balancing procedure S1000 is ended. In one embodiment, subsequent to the above-mentioned step S20, after a delay period T1 has passed (as shown by the step S21 in FIG. 9), the battery system balancing procedure S1000 performed by the battery system balance management unit 21 can return to the above-mentioned step S12 again.

The features and the details of the battery module balancing procedure S2000 performed by each MBMC 221 of the corresponding BM (22-1, 22-2, . . . , 22-M−1, 22-M) are now described.

Figure 10:
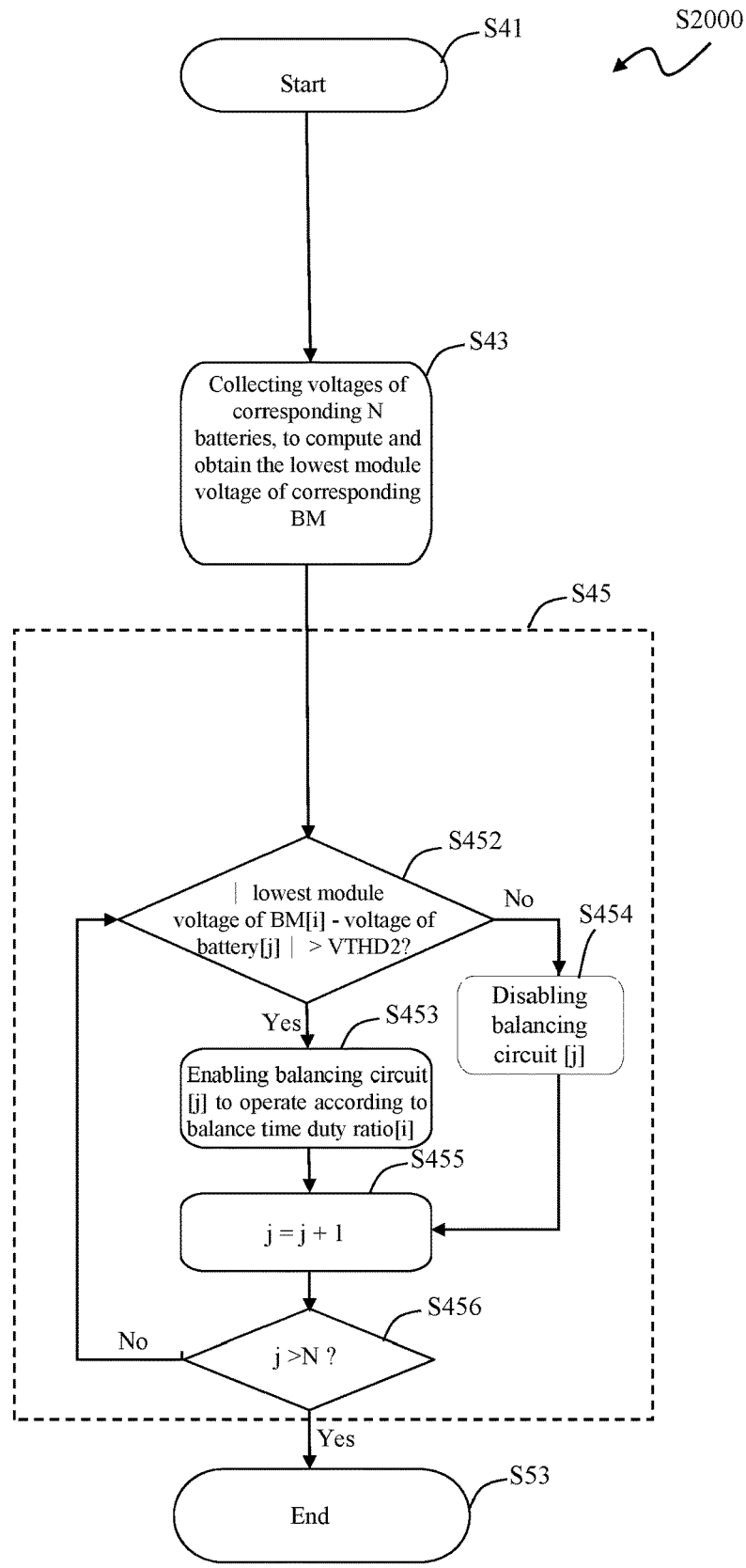
FIG. 10 shows an embodiment of a battery module balancing procedure S2000 performed by a corresponding module balance management circuit (MBMC).

Please refer to FIG. 10 along with FIG. 3 and FIG. 4. FIG. 10 shows an embodiment of a battery module balancing procedure S2000 performed by a corresponding module balance management circuit (MBMC). As shown in FIG. 10, in one embodiment, the battery module balancing procedure S2000 performed by each MBMC 221 of the corresponding BM (22-1, 22-2, . . . , 22-M−1, 22-M) includes: start (as shown by the step S41 in FIG. 10); next, each MBMC 221 collects voltage information of the N batteries (B-1, . . . , B-N−1, B-N) of the battery group 223 of the corresponding BM (22-1, 22-2, . . . , 22-M−1, 22-M). And, each MBMC 221 computes and obtains the lowest module voltage of the corresponding BM (22-1, 22-2, . . . , 22-M−1, 22-M) according to all the N batteries (B-1, . . . , B-N−1, B-N) of the corresponding BM (22-1, 22-2, . . . , 22-M−1, 22-M).

As described above, according to the present invention (as shown by the step S13 in FIG. 6 and as shown by the step S43 in FIG. 10), the M BMs (22-1, 22-2, . . . , 22-M−1, 22-M) will have a total of M "lowest module voltages".

Next, the battery module balancing procedure S2000 performed by each MBMC 221 of the corresponding BM (22-1, 22-2, . . . , 22-M−1, 22-M) will perform a "balance enablement step" (as shown by the step S45 in FIG. 10). In one embodiment, the "balance enablement step" S45 includes: each MBMC 221 of the corresponding BM (22-1, 22-2, . . . , 22-M−1, 22-M) performs the following steps on each battery of the corresponding BM (22-1, 22-2, . . . , 22-M−1, 22-M).

To be more specific, in the "balance enablement step" (as shown by the step S45 in FIG. 10), first, the step S452 is performed. In one embodiment, the step S452 includes: each MBMC 221 determines whether a difference between the lowest module voltage of the corresponding BM (22-1, 22-2, . . . , 22-M−1, 22-M) and the voltage of a battery (B-1, B-N−1, B-N) is greater than a difference threshold VTHD2.

Next, each MBMC 221 determines, for each battery (B-1, . . . , B-N−1, B-N), whether the procedure should proceed to the step S453 or the step S454, according to the determination result for the battery (B-1, B-N−1, B-N) in the step S452. In other words, when the determination result for a certain battery in the step S452 is yes, the MBMC 221 of the corresponding BM will perform the step S453 on this certain battery. On the other hand, when the determination result for a certain battery in the step S452 is no, the MBMC 221 of the corresponding BM will perform the step S454 on this certain battery. In one embodiment, the step S453 includes: each MBMC 221 of the corresponding BM (22-1, 22-2, . . . , 22-M−1, 22-M) enables the corresponding balancing circuit (i.e., the balancing circuit which corresponds to a battery whose determination result in the step S452 is yes), to perform the voltage balance control on this battery according to the corresponding balance time duty ratio.

In the present invention, as described above, in the battery module balancing procedure S2000, the M MBMCs 221 controls the balancing circuits (222-1, . . . , 222-N−1, 222-N) of the corresponding BMs (22-1, 22-2, . . . , 22-M−1, 22-M) according to the M "balance time duty ratios" obtained from the battery system balancing procedure S1000, thereby performing voltage balance control on the batteries corresponding to the balancing circuits (222-1, . . . , 222-N−1, 222-N).

From another perspective, it indicates that: in the battery module balancing procedure S2000, it is necessary for the M MBMCs 221 to control the balancing circuits (222-1, . . . , 222-N−1, 222-N) of the corresponding BMs (22-1, 22-2, . . . , 22-M−1, 22-M) according to the M "balance time duty ratios" obtained from the battery system balancing procedure S1000.

On the other hand, in one embodiment, the step S454 includes: each MBMC 221 of the corresponding BM (22-1, 22-2, . . . , 22-M−1, 22-M) disables the corresponding balancing circuit (i.e., the balancing circuit which corresponds to a battery whose determination result in the step S452 is no), so as not to perform voltage balance control on this battery. That is, the battery module balancing procedure S2000 will not perform voltage balance control on such battery whose determination result in the step S452 is no.

Note that, in one embodiment, as shown in FIG. 10, subsequent to the step S453 and the step S454, the battery module balancing procedure S2000 performed by each MBMC 221 of the corresponding BM (22-1, 22-2, . . . , 22-M−1, 22-M) can proceed to the step S455 and the step S456. That is, that is, by a process loop, the battery module balancing procedure S2000 causes the N batteries of the corresponding BM to go through the above-mentioned same steps. Next, subsequent to the step S456, the battery module balancing procedure S2000 performed by each MBMC 221 of the corresponding BM (22-1, 22-2, . . . , 22-M−1, 22-M) will directly proceed to the step S53 (as shown by the step S53 in FIG. 10). In one embodiment, the step S53 includes: the battery module balancing procedure S2000 is ended. Note that, the illustrated steps S455 and S456 are examples only, but not for limiting the scope of the present invention; in other embodiments, the process loop can be arranged differently (for example by a descending order instead of an ascending order). Additionally, the reference numeral "[j]" as shown by the battery [j] and the balancing circuit [j] in the step S45 of FIG. 10 is a number of count. In this embodiment, the count "j" will count from 1 to N+1, and at N+1 the battery module balancing procedure S2000 will exit the loop; however, the loop can be designed in other ways, still within the spirit of the present invention. Note that, the battery [j] corresponds to the battery B-j of any of the BM (e.g., BM 22-1) and the balancing circuit [j] corresponds to the balancing circuit 222-j (which corresponds to the battery B-j shown in FIG. 2). In one embodiment, j=1-N.

Figure 11:
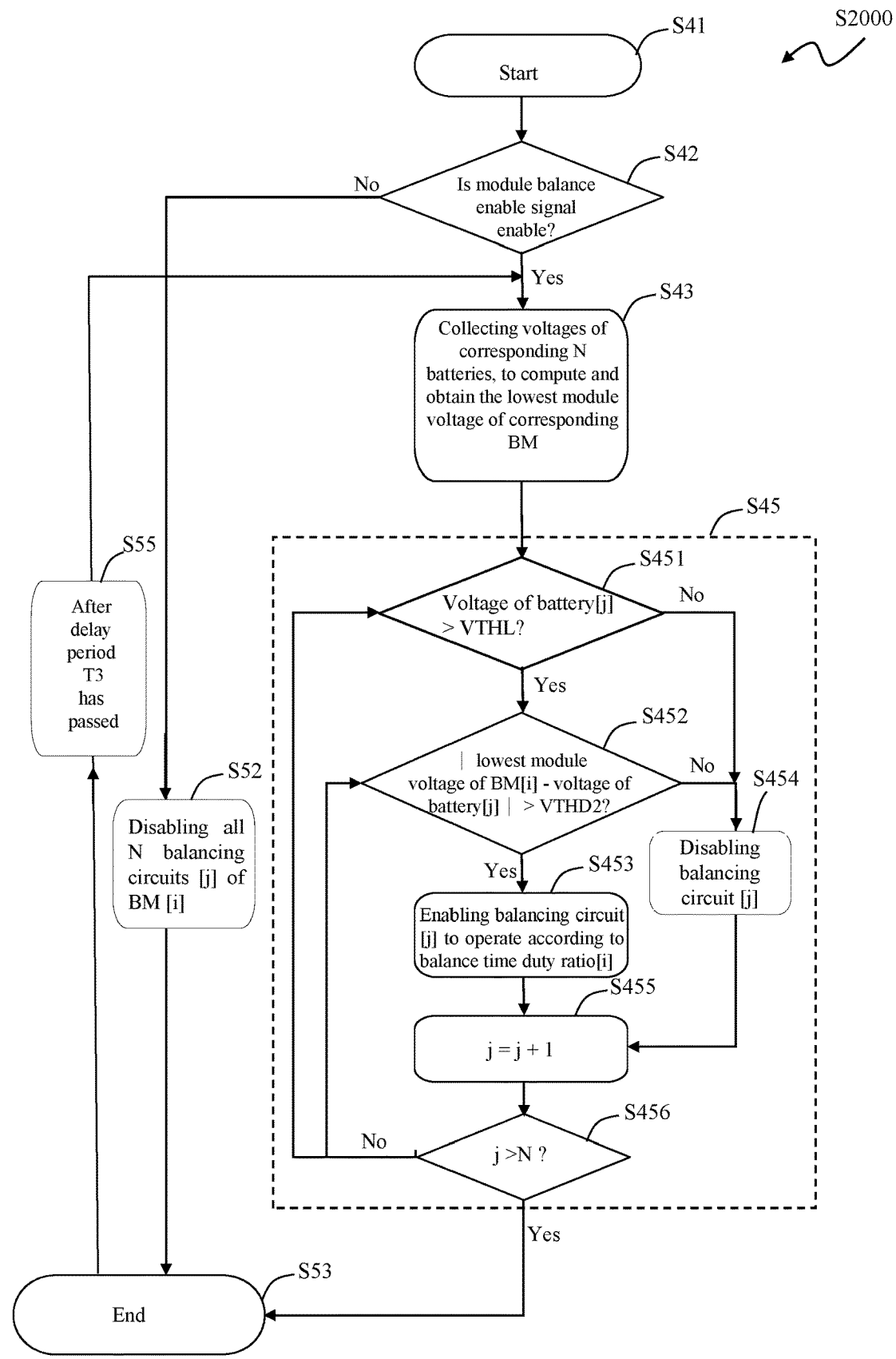
FIG. 11 shows another embodiment of a battery module balancing procedure S2000 performed by a corresponding MBMC.

Please refer to FIG. 11 along with FIG. 3 and FIG. 4. FIG. 11 shows another embodiment of a battery module balancing procedure S2000 performed by a corresponding MBMC.

As shown in FIG. 11, in one embodiment, the "balance enablement step" (as shown by the step S45 in FIG. 11) in the battery module balancing procedure S2000 performed by each MBMC 221 of the corresponding BM (22-1, 22-2, . . . , 22-M−1, 22-M) can further determine whether the voltage of a battery (B-1, . . . , B-N−1, B-N) of the corresponding BM (22-1, 22-2, . . . , 22-M−1, 22-M) is greater than a lower-limit threshold VTHL (as shown by the step S451 in FIG. 11). When it is determined yes in the step S451, the battery module balancing procedure S2000 proceeds to the above-mentioned step S452. When it is determined no in the step S451, the battery module balancing procedure S2000 proceeds to the above-mentioned step S454.

Please still refer to FIG. 11 along with FIG. 3 and FIG. 4. As shown in FIG. 11, in one embodiment, the battery module balancing procedure S2000 performed by each MBMC 221 of the corresponding BM (22-1, 22-2, . . . , 22-M−1, 22-M) can further include the step S42. In one embodiment, the step S42 includes: each MBMC 221 of the corresponding BM (22-1, 22-2, . . . , 22-M−1, 22-M) determines whether the module balance enable signal of the corresponding MBMC 221 is enable. In this embodiment, when it is determined yes in the step S42, each MBMC 221 of the corresponding BM (22-1, 22-2, . . . , 22-M−1, 22-M) proceeds to the above-mentioned step S43. On the other hand, when it is determined no in the step S42, each MBMC 221 of the corresponding BM (22-1, 22-2, . . . , 22-M−1, 22-M) proceeds to the step S52. In one embodiment, the step S52 includes: each MBMC 221 of the corresponding BM (22-1, 22-2, . . . , 22-M−1, 22-M) disables all the N balancing circuits of the corresponding BM. Next, subsequent to the step S45, the battery module balancing procedure S2000 performed by each MBMC 221 of the corresponding BM (22-1, 22-2, . . . , 22-M−1, 22-M) will directly proceed to the step S53 (as shown by the step S53 in FIG. 11). In one embodiment, the step S53 includes: the battery module balancing procedure S2000 is ended.

Please still refer to FIG. 11 along with FIG. 3 and FIG. 4. As shown in FIG. 11, in one embodiment, the battery module balancing procedure S2000 performed by each MBMC 221 of the corresponding BM (22-1, 22-2, . . . , 22-M−1, 22-M) can further include the step S55. In one embodiment, the step S55 includes: after a delay period T3 has passed (as shown by the step S55 in FIG. 11), the battery module balancing procedure S2000 performed by each MBMC 221 can return to the above-mentioned step S43 again. In this embodiment, the step S53 can be regarded as one of the options. In other words, from one perspective, subsequent to the step S45, the battery module balancing procedure S2000 performed by each MBMC 221 can either choose to end (as shown by the step S53 in FIG. 11) or choose to return to a previous step by going through the step S55. It is noted here that all occurrences of the "end" in this specification can be regarded as just one of the options and the procedure can choose to return to a previous step.

Figure 12:
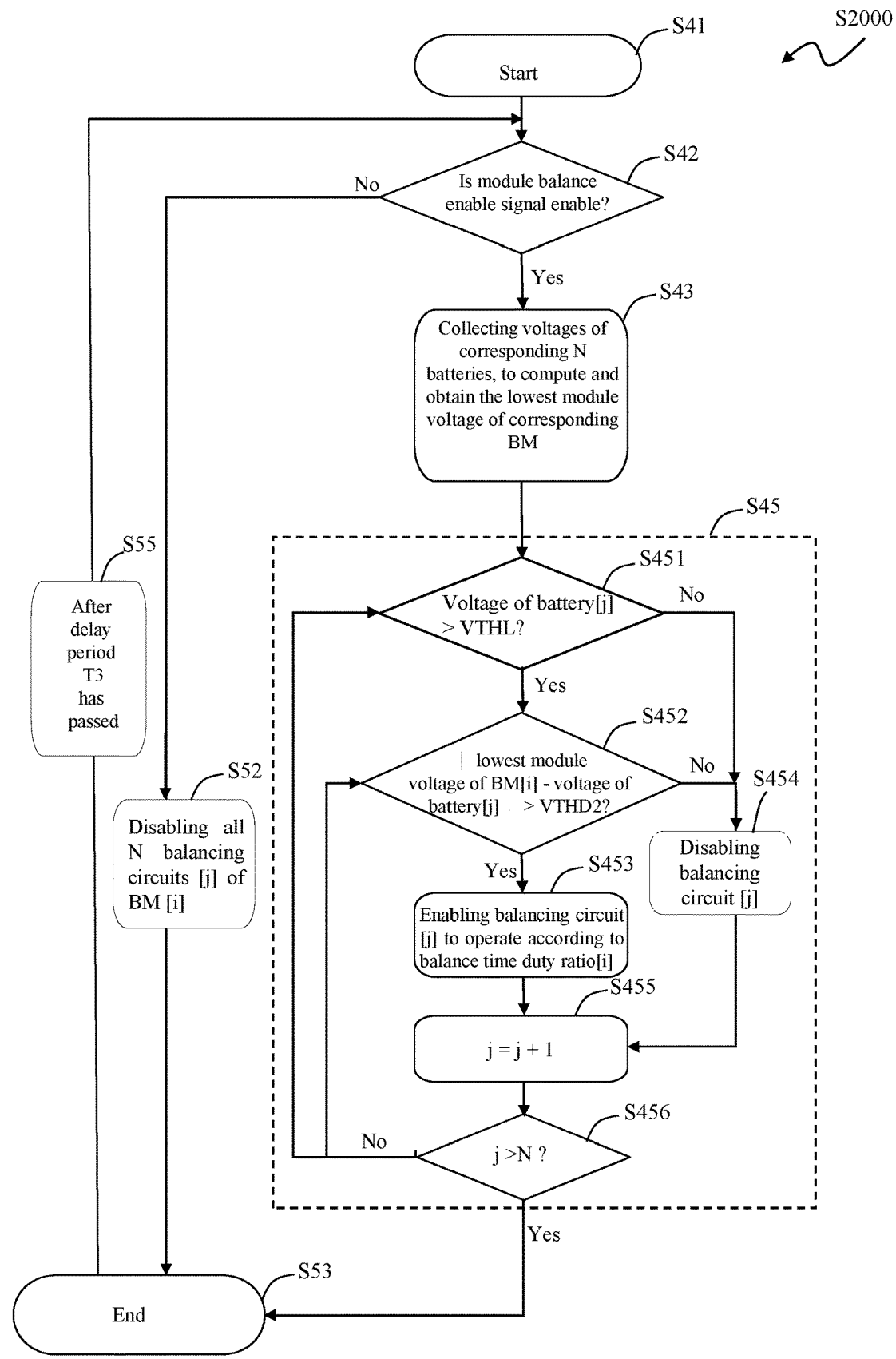
FIG. 12 shows yet another embodiment of a battery module balancing procedure S2000 performed by a corresponding MBMC.

Please refer to FIG. 12 along with FIG. 3 and FIG. 4. FIG. 12 shows yet another embodiment of a battery module balancing procedure S2000 performed by a corresponding MBMC. As shown in FIG. 12, in this embodiment, the step S55 includes: after the delay period T3 has passed (as shown by the step S55 in FIG. 12), the battery module balancing procedure S2000 performed by each MBMC 221 can return to the above-mentioned step S42 again.

Figure 13:
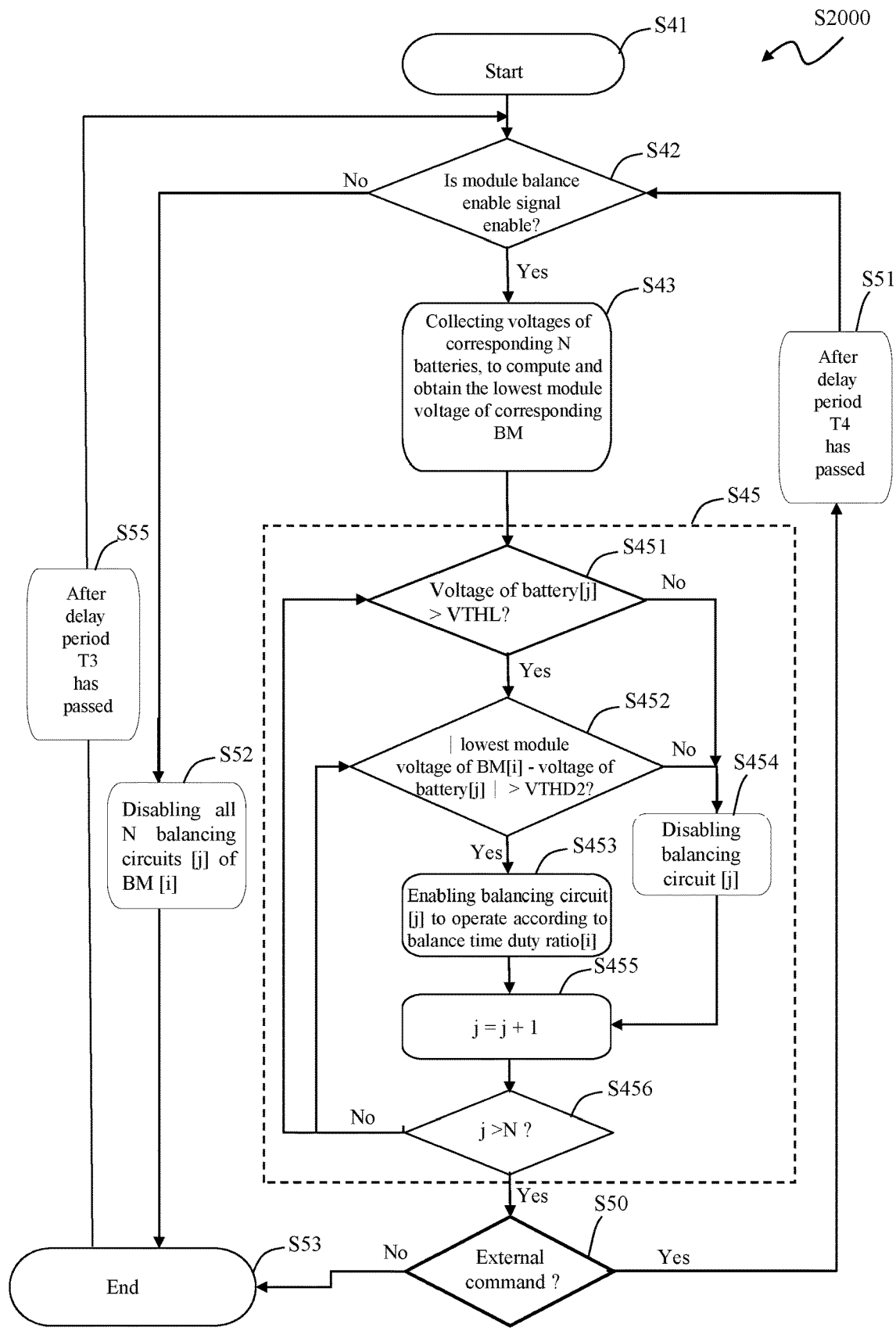
FIG. 13 shows still another embodiment of a battery module balancing procedure S2000 performed by a corresponding MBMC.

Please refer to FIG. 13 along with FIG. 3 and FIG. 4. FIG. 13 shows still another embodiment of a battery module balancing procedure S2000 performed by an MBMC.

As shown in FIG. 13, in one embodiment, after the above-mentioned balance enablement step S45 has been performed on all the N batteries (i.e., after the determination result in the step S456 shown in FIG. 13 has been determined as yes), the battery module balancing procedure S2000 performed by each MBMC 221 of the corresponding BM (22-1, 22-2, . . . , 22-M−1, 22-M) can further perform the step S50. In one embodiment, the step S50 includes: subsequent to the step S45, each MBMC 221 of the corresponding BM (22-1, 22-2, . . . , 22-M−1, 22-M) determines whether the battery module balancing procedure S2000 is required to be performed according to an external command.

When it is determined yes in the step S50, the battery module balancing procedure S2000 performed by each MBMC 221 of the corresponding BM (22-1, 22-2, . . . , 22-M−1, 22-M) can return to the above-mentioned step S42 after a delay period T4 has passed (as shown by the step S51 in FIG. 13).

When it is determined no in the step S50, the battery module balancing procedure S2000 performed by each MBMC 221 of the corresponding BM (22-1, 22-2, . . . , 22-M−1, 22-M) can directly proceed to the above-mentioned step S53 (as shown by the step S53 in FIG. 13), indicating that the battery module balancing procedure S2000 is ended. In one embodiment, subsequent to the above-mentioned step S53, after the delay period T4 has passed (as shown by the step S51 in FIG. 13), the battery module balancing procedure S2000 performed by each MBMC 221 of the corresponding BM (22-1, 22-2, . . . , 22-M−1, 22-M) can return back to the above-mentioned step S42.

Note that, it is not limited for each of the embodiments shown in FIG. 6, FIG. 7, FIG. 8 and FIG. 9 to be used alone; under the spirit of the present invention, for example, two or more of the embodiments shown in FIG. 6, FIG. 7, FIG. 8 and FIG. 9 can be used in combination, or, a part of one embodiment can be used to replace a corresponding part of another embodiment.

Similarly, it is not limited for each of the embodiments shown in FIG. 10, FIG. 11, FIG. 12 and FIG. 13 to be used alone; under the spirit of the present invention, for example, two or more of the embodiments shown in FIG. 10, FIG. 11, FIG. 12 and FIG. 13 can be used in combination, or, a part of one embodiment can be used to replace a corresponding part of another embodiment.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A distributed battery balance management method, which is configured to operably control a battery system to achieve system voltage balance for the entire battery system, wherein the battery system comprises: a battery system balance management unit and a total of M battery modules (BM), wherein the BMs are coupled to the battery system balance management unit via a communication interface, wherein M is a positive integer greater than one, wherein each BM includes: a module balance management circuit (MBMC), which is coupled to the battery system balance management unit via the communication interface; a battery group having a total of N batteries connected in series, wherein each battery group is coupled to the corresponding MBMC, wherein N is a positive integer greater than one; and a total of N balancing circuits, wherein each balancing circuit is coupled to the corresponding battery and the balancing circuits are coupled to the MBMC of the corresponding BM, wherein the BMs as a whole include a total of M battery groups which are connected in series, wherein the M battery groups are configured to operably supply a battery system voltage; the distributed battery balance management method comprising:

performing a battery system balancing procedure by the battery system balance management unit; and
performing a battery module balancing procedure by the MBMC of the corresponding BM; wherein the battery system balancing procedure includes:
(S13): obtaining voltages of all the batteries of the battery system by the MBMCs via the communication interface and obtaining a lowest module voltage of each corresponding BM, wherein the lowest module voltage is defined as a lowest voltage among all the voltages of N batteries in the corresponding BM;
(S14): computing and obtaining a lowest system voltage and an average system voltage of the battery system according to the voltages of all the batteries of the battery system, wherein the lowest system voltage is defined as a lowest voltage among the voltages of all the batteries of the battery system, wherein the average system voltage is defined as an average of the voltages of all the batteries of the battery system; and
a module setting step (S15): performing the following steps on each BM:
(S152): determining whether the lowest module voltage of the corresponding BM is greater than the average system voltage; when it is determined yes, proceeding to a step (S153); when it is determined no, proceeding to a step (S154);
(S153): setting a balance time duty ratio of the corresponding MBMC as a first duty ratio;
(S154): setting the balance time duty ratio of the corresponding MBMC as a second duty ratio, wherein the first duty ratio is greater than the second duty ratio; and
(S155): setting a module balance enable signal of the corresponding MBMC to be enable, wherein when the module balance enable signal of the corresponding MBMC is enable, allowing the corresponding BM to perform voltage balance control on the total of N batteries in the corresponding BM;
wherein in the battery module balancing procedure, each MBMC is configured to operably control each balancing circuit of the corresponding BM according to the corresponding balance time duty ratio, thereby performing the voltage balance control on the battery corresponding to the balancing circuit.

2. The distributed battery balance management method of claim 1, wherein the module setting step (S15) further includes: performing the following steps on each BM:
(S151): determining whether a difference between the lowest module voltage of the corresponding BM and the lowest system voltage is greater than a first difference threshold; when it is determined yes, proceeding to the step (S152); when it is determined no, proceeding to a step (S158); and
(S158): setting the module balance enable signal of the corresponding MBMC of the corresponding BM to be disable;
wherein when the module balance enable signal is disable, forbidding the corresponding BM to perform the voltage balance control on any of the batteries in the corresponding BM.

3. The distributed battery balance management method of claim 1, wherein the battery system balancing procedure further includes:
(S12): determining whether the battery system is being discharged according to a system current of the battery system; when it is determined no, proceeding to the step (S13); when it is determined yes, proceeding to a step (S18);
wherein the step (S18) includes: setting all the module balance enable signals of all the M BMs of the battery system to be disable.

4. The distributed battery balance management method of claim 1, wherein the battery system balancing procedure further includes:

(S21): subsequent to the step (S15), after a delay period (T1) has passed, returning back to the step (S13).

5. The distributed battery balance management method of claim 3, wherein the battery system balancing procedure further includes:
(S21): subsequent to the step (S15), after a delay period (T1) has passed, returning back to the step (S12).

6. The distributed battery balance management method of claim 3, wherein after the module setting step (S15) has been performed on all the M BMs, the distributed battery balance management method further includes:
(S16): determining whether the battery system balancing procedure is required to be performed according to a first external command; when it is determined yes, returning back to the step (S12) after a delay period (T2) has passed; when it is determined no, proceeding to a step (S20), wherein the step (S20) indicates that the distributed battery balance management method comes to an end.

7. The distributed battery balance management method of claim 1, wherein the first duty ratio and the second duty ratio are obtained according to one of the following ways:
(1) the second duty ratio is a predetermined value, whereas, the first duty ratio is the predetermined value plus a duty ratio difference;
(2) the first duty ratio is a predetermined value, whereas, the second duty ratio is the predetermined value minus a duty ratio difference; or
(3) the first duty ratio is a predetermined value plus a duty ratio difference, whereas, the second duty ratio is the predetermined value minus the duty ratio difference.

8. The distributed battery balance management method of claim 7, wherein the duty ratio difference is a constant.

9. The distributed battery balance management method of claim 7, wherein the duty ratio difference is correlated with a balance voltage difference or a balance battery capacity.

10. The distributed battery balance management method of claim 1, wherein the battery module balancing procedure includes:
(S43): each MBMC collects voltages of the batteries of the battery group of the corresponding BM and each MBMC computes and obtains the lowest module voltage of the corresponding BM according to all the N batteries of the corresponding BM; and
a balance enablement step (S45): performing the following steps on each battery:
(S452): determining whether a difference between the lowest module voltage of the corresponding BM and the voltage of the corresponding battery is greater than a second difference threshold; when it is determined yes, proceeding to a step (S453); when it is determined no, proceeding to a step (S454);
(S453): each MBMC enables the balancing circuit corresponding to the battery to perform the voltage balance control on the battery according to the corresponding balance time duty ratio; and
(S454): each MBMC disables the corresponding balancing circuit of the corresponding battery.

11. The distributed battery balance management method of claim 10, wherein the balance enablement step (S45) further includes:
(S451): determining whether the voltage of the corresponding battery is greater than a lower-limit threshold; when it is determined yes, proceeding to the step (S452); when it is determined no, proceeding to the step (S454).

12. The distributed battery balance management method of claim 10, wherein the battery module balancing procedure further includes:
(S42): determining whether the module balance enable signal of the corresponding MBMC is enable; when it is determined yes, proceeding to the step (S43); when it is determined no, proceeding to a step (S52);
wherein the step (S52) includes: disabling all the N balancing circuits of the corresponding BM.

13. The distributed battery balance management method of claim 10, wherein the battery module balancing procedure further includes:
(S55): subsequent to the step (S45), after a delay period (T3) has passed, returning back to the step (S43).

14. The distributed battery balance management method of claim 12, wherein the battery module balancing procedure further includes:
(S55): subsequent to the step (S45), after a delay period (T3) has passed, returning back to the step (S42).

15. The distributed battery balance management method of claim 12, wherein after the balance enablement step (S45) has been performed on all the N batteries, the distributed battery balance management method further includes:
(S50): determining whether the battery module balancing procedure is required to be performed according to a second external command; when it is determined yes, returning back to the step (S42) after a delay period (T4) has passed; when it is determined no, proceeding to a step (S53), wherein the step (S53) indicates that the distributed battery balance management method comes to an end.

16. The distributed battery balance management method of claim 10, wherein each balancing circuit includes a bypass switch and a bypass resistive device, wherein the bypass switch and the bypass resistive device are coupled to the corresponding battery;
wherein the step (S453) includes: each BM is configured to operably control the corresponding bypass switch according to the corresponding balance time duty ratio, so that a bypass current flows through the corresponding bypass switch for a corresponding balance time, thereby performing the voltage balance control on the corresponding battery of the corresponding balancing circuit; wherein the balance time is positively proportional to the corresponding balance time duty ratio.

17. A battery system, comprising:
a battery system balance management unit; and
a total of M battery modules (BM), which are coupled to the battery system balance management unit via a communication interface, wherein M is a positive integer greater than one;
wherein each BM includes:
a module balance management circuit (MBMC), which is coupled to the battery system balance management unit via the communication interface;
a battery group having a total of N batteries connected in series, wherein each battery group is coupled to the corresponding MBMC, wherein N is a positive integer greater than one; and
a total of N balancing circuits, wherein each balancing circuit is coupled to the corresponding battery and the balancing circuits are coupled to the corresponding MBMC, wherein the BMs as a whole include a total of M battery groups which are connected in series, wherein the M battery groups are configured to operably supply a battery system voltage;

wherein the battery system balance management unit is configured to operably perform a battery system balancing procedure;

wherein each MBMC of the corresponding BM is configured to operably perform a corresponding battery module balancing procedure;

wherein the battery system balancing procedure performed by the battery system balance management unit includes:
- (S13): obtaining voltages of all the batteries of the battery system by the MBMCs via the communication interface and obtaining a lowest module voltage of each corresponding BM, wherein the lowest module voltage is defined as a lowest voltage among all the voltages of N batteries in the corresponding BM;
- (S14): computing and obtaining a lowest system voltage and an average system voltage of the battery system according to the voltages of all the batteries of the battery system, wherein the lowest system voltage is defined as a lowest voltage among the voltages of all the batteries of the battery system, wherein the average system voltage is defined as an average of the voltages of all the batteries of the battery system; and
- a module setting step (S15): performing the following steps on each BM:
  - (S152): determining whether the lowest module voltage of the corresponding BM is greater than the average system voltage; when it is determined yes, proceeding to a step (S153); when it is determined no, proceeding to a step (S154);
  - (S153): setting a balance time duty ratio of the corresponding MBMC as a first duty ratio;
  - (S154): setting the balance time duty ratio of the corresponding MBMC as a second duty ratio, wherein the first duty ratio is greater than the second duty ratio; and
  - (S155): setting a module balance enable signal of the corresponding MBMC to be enable, wherein when the module balance enable signal of the corresponding MBMC is enable, allowing the corresponding BM to perform voltage balance control on the total of N batteries in the corresponding BM;

wherein each MBMC is configured to operably control each balancing circuit of the corresponding BM according to the corresponding balance time duty ratio, thereby performing the voltage balance control on the battery corresponding to the balancing circuit.

18. The battery system of claim 17, wherein the module setting step (S15) further includes: performing following the steps on each BM:
- (S151): determining whether a difference between the lowest module voltage of the corresponding BM and the lowest system voltage is greater than a first difference threshold; when it is determined yes, proceeding to the step (S152); when it is determined no, proceeding to a step (S158); and
- (S158): setting the module balance enable signal of the corresponding MBMC of the corresponding BM to be disable;

wherein when the module balance enable signal is disable, forbidding the corresponding BM to perform the voltage balance control on any of the batteries in the corresponding BM.

19. The battery system of claim 17, wherein the battery system balancing procedure performed by the battery system balance management unit further includes:
- (S12): determining whether the battery system is being discharged according to a system current of the battery system; when it is determined no, proceeding to the step (S13); when it is determined yes, proceeding to a step (S18);

wherein the step (S18) includes: setting all the module balance enable signals of all the M BMs of the battery system to be disable.

20. The battery system of claim 17, wherein the battery system balancing procedure performed by the battery system balance management unit further includes:
- (S21): subsequent to the step (S15), after a delay period (T1) has passed, returning back to the step (S13).

21. The battery system of claim 19, wherein the battery system balancing procedure performed by the battery system balance management unit further includes:
- (S21): subsequent to the step (S15), after a delay period (T1) has passed, returning back to the step (S12).

22. The battery system of claim 19, wherein after the module setting step (S15) has been performed on all the M BMs, the distributed battery balance management method further includes:
- (S16): determining whether the battery system balancing procedure is required to be performed according to a first external command; when it is determined yes, returning back to the step (S12) after a delay period (T2) has passed; when it is determined no, proceeding to a step (S20), wherein the step (S20) indicates that the distributed battery balance management method comes to an end.

23. The battery system of claim 17, wherein the first duty ratio and the second duty ratio are obtained according to one of the following ways:
(1) the second duty ratio is a predetermined value, whereas, the first duty ratio is the predetermined value plus a duty ratio difference;
(2) the first duty ratio is a predetermined value, whereas, the second duty ratio is the predetermined value minus a duty ratio difference; or
(3) the first duty ratio is a predetermined value plus a duty ratio difference, whereas, the second duty ratio is the predetermined value minus the duty ratio difference.

24. The battery system of claim 23, wherein the duty ratio difference is a constant.

25. The battery system of claim 23, wherein the duty ratio difference is correlated with a balance voltage difference or a balance battery capacity.

26. The battery system of claim 17, wherein the battery module balancing procedure performed by each MBMC includes:
- (S43): each MBMC collects voltages of the batteries of the battery group of the corresponding BM and each MBMC computes and obtains the lowest module voltage of the corresponding BM according to all the N batteries of the corresponding BM; and
- a balance enablement step (S45): performing the following steps on each battery:
  - (S452): determining whether a difference between the lowest module voltage of the corresponding BM and the voltage of the corresponding battery is greater than a second difference threshold; when it is determined yes, proceeding to a step (S453); when it is determined no, proceeding to a step (S454);

(S453): each MBMC enables the balancing circuit corresponding to the battery to perform the voltage balance control on the battery according to the corresponding balance time duty ratio; and (S454): each MBMC disables the corresponding balancing circuit of the corresponding battery.

27. The battery system of claim 26, wherein the balance enablement step (S45) further includes:

(S451): determining whether the voltage of the corresponding battery is greater than a lower-limit threshold; when it is determined yes, proceeding to the step (S452); when it is determined no, proceeding to the step (S454).

28. The battery system of claim 26, wherein the battery module balancing procedure performed by each MBMC further includes:

(S42): determining whether the module balance enable signal of the corresponding MBMC is enable; when it is determined yes, proceeding to the step (S43); when it is determined no, proceeding to a step (S52);

wherein the step (S52) includes: disabling all the N balancing circuits of the corresponding BM.

29. The battery system of claim 26, wherein the battery module balancing procedure performed by each MBMC further includes:

(S55): subsequent to the step (S45), after a delay period (T3) has passed, returning back to the step (S43).

30. The battery system of claim 28, wherein the battery module balancing procedure performed by each MBMC further includes:

(S55): subsequent to the step (S45), after a delay period (T3) has passed, returning back to the step (S42).

31. The battery system of claim 28, wherein after the balance enablement step (S45) has been performed on all the N batteries, the distributed battery balance management method further includes:

(S50): determining whether the battery module balancing procedure is required to be performed according to a second external command; when it is determined yes, returning back to the step (S42) after a delay period (T4) has passed; when it is determined no, proceeding to a step (S53), wherein the step (S53) indicates that the distributed battery balance management method comes to an end.

32. The battery system of claim 26, wherein each balancing circuit includes a bypass switch and a bypass resistive device, wherein the bypass switch and the bypass resistive device are coupled to the corresponding battery;

wherein each BM is configured to operably control the corresponding bypass switch according to the corresponding balance time duty ratio, so that a bypass current flows through the corresponding bypass switch for a corresponding balance time, thereby performing the voltage balance control on the corresponding battery of the corresponding balancing circuit;

wherein the balance time is positively proportional to the corresponding balance time duty ratio.

* * * * *